(12) United States Patent
Tsujimoto

(10) Patent No.: US 11,981,406 B2
(45) Date of Patent: May 14, 2024

(54) NON-TRANSITORY COMPUTER READABLE STORAGE MEDIUM CONTAINING PROGRAM INSTRUCTIONS FOR CAUSING A COMPUTER TO EXECUTE STEPS FOR AN EVALUATION PROGRAM OF SHIP PROPULSIVE PERFORMANCE IN ACTUAL SEAS

(71) Applicant: National Institute of Maritime, Port and Aviation Technology, Tokyo (JP)

(72) Inventor: Masaru Tsujimoto, Tokyo (JP)

(73) Assignee: NATIONAL INSTITUTE OF MARITIME, PORT AND AVIATION TECHNOLOGY, Tokyo (JP)

(*) Notice: Subject to any disclaimer, the term of this patent is extended or adjusted under 35 U.S.C. 154(b) by 807 days.

(21) Appl. No.: 17/054,944

(22) PCT Filed: May 14, 2019

(86) PCT No.: PCT/JP2019/019144
§ 371 (c)(1),
(2) Date: Dec. 17, 2020

(87) PCT Pub. No.: WO2019/221125
PCT Pub. Date: Nov. 21, 2019

(65) Prior Publication Data
US 2021/0214057 A1    Jul. 15, 2021

(30) Foreign Application Priority Data

May 14, 2018  (JP) ................................. 2018-093146
Dec. 5, 2018   (JP) ................................. 2018-227939

(51) Int. Cl.
B63B 79/30 (2020.01)
B63B 79/15 (2020.01)
(Continued)

(52) U.S. Cl.
CPC .............. *B63B 79/30* (2020.01); *B63B 79/15* (2020.01); *B63H 21/12* (2013.01); *B63H 21/21* (2013.01); *B63H 2021/216* (2013.01)

(58) Field of Classification Search
CPC ......... B63B 79/30; B63B 79/15; B63B 79/40; B63B 71/10; B63B 49/00; B63H 21/12; B63H 21/21; B63H 2021/216; Y02T 70/10
See application file for complete search history.

(56) References Cited

U.S. PATENT DOCUMENTS

2009/0048726 A1* 2/2009 Lofall .................... B63B 79/20
                                                                            701/21
2012/0259489 A1* 10/2012 Hamamatsu ......... G01C 21/203
                                                                            701/21
(Continued)

FOREIGN PATENT DOCUMENTS

CN   104507792 A     4/2015
EP   2669173 A1     12/2013
(Continued)

OTHER PUBLICATIONS

Office Action of corresponding Chinese Patent Application No. 201980031037.1 dated Feb. 9, 2023 (8 sheets).
(Continued)

*Primary Examiner* — Mussa A Shaawat
(74) *Attorney, Agent, or Firm* — Kratz, Quintos & Hanson, LLP

(57) ABSTRACT

Objects of the present invention are provide as evaluation method of ship propulsive performance in actual seas, an evaluation program of ship propulsive performance in actual seas and an evaluation. system of ship propulsive performance in actual seas capable of precisely evaluating ship propulsive performance in actual seas on the same scale also before the ship sails for example. As solving means of the (Continued)

objects, a standard sailing model 2 of the ship in actual seas is set, a sailing condition of the ship and a ship condition of the ship are input to the standard sailing model 2, the standard sailing model 2 into which the sailing condition and the ship condition are input and the ship condition are applied to a previously verified calculating method 1 of ship performance is actual seas, and ship propulsive performance in actual seas is evaluated.

14 Claims, 9 Drawing Sheets

(51) Int. Cl.
  B63H 21/12 (2006.01)
  B63H 21/21 (2006.01)

(56) References Cited

U.S. PATENT DOCUMENTS

| | | | | |
|---|---|---|---|---|
| 2014/0336853 | A1* | 11/2014 | Bradenham | B63B 49/00 701/21 |
| 2015/0149135 | A1* | 5/2015 | Tervo | G05B 17/02 703/8 |
| 2015/0149136 | A1* | 5/2015 | Tervo | B63B 79/10 703/8 |
| 2016/0147223 | A1* | 5/2016 | Edwards | B63B 79/40 701/2 |
| 2016/0229500 | A1* | 8/2016 | Ando | G06F 3/14 |
| 2016/0244302 | A1* | 8/2016 | Martin | B66D 1/525 |
| 2016/0251064 | A1 | 9/2016 | Ishioka | |
| 2016/0265920 | A1* | 9/2016 | Yamaguchi | B63B 49/00 |
| 2017/0010591 | A1 | 1/2017 | Fujii | |
| 2017/0369127 | A1* | 12/2017 | Cusano | G01S 13/956 |
| 2018/0273144 | A1* | 9/2018 | Skidmore | B63B 79/30 |
| 2018/0341729 | A1* | 11/2018 | Kowalyshyn | B63B 79/20 |
| 2019/0270502 | A1* | 9/2019 | Antola | G01P 3/00 |
| 2020/0363209 | A1* | 11/2020 | Isojärvi | G07C 5/008 |
| 2022/0194533 | A1* | 6/2022 | Stojanovic | G01C 21/203 |

FOREIGN PATENT DOCUMENTS

| | | |
|---|---|---|
| JP | 4934756 B1 | 5/2012 |
| JP | 2014-119356 A | 6/2014 |
| JP | 2015-190970 A | 11/2015 |
| JP | 2016-078685 A | 5/2016 |
| JP | 2018-034585 A | 3/2018 |

OTHER PUBLICATIONS

Extended European Search Report for European Patent Application No. 19804113.9 dated Feb. 7, 2022 (10 sheets).

International Search Report for International Application No. PCT/JP2019/019144 dated Jul. 30, 2019 (2 sheets).

* cited by examiner

NON-TRANSITORY COMPUTER READABLE STORAGE MEDIUM CONTAINING PROGRAM INSTRUCTIONS FOR CAUSING A COMPUTER TO EXECUTE STEPS FOR AN EVALUATION PROGRAM OF SHIP PROPULSIVE PERFORMANCE IN ACTUAL SEAS

TECHNICAL FIELD

The present invention relates to an evaluation method of ship propulsive performance in actual seas, an evaluation program of ship propulsive performance in actual seas and an evaluation system of ship propulsive performance in actual seas for evaluation ship propulsive performance in actual seas.

BACKGROUND TECHNIQUE

Evaluation of propulsive performance of a ship is made by estimation based on a tank test by a model ship, or based on ascertainment of sea trial in a relatively calm weather/marine weather condition.

However, a ship navigates in actual seas having waves, wind, ocean current, tidal current and the like. Propulsive performance of a ship is deteriorated by waves and wind, aging deterioration varied with time (evaluation period). Hence, a gap is observed between evaluated propulsive performance and the attained performance in actual operating condition.

To reduce the gap between the evaluated propulsive performance and performance in actual operating condition, it is preferable to evaluate propulsive performance in actual seas. However, in an actual operating condition, there are problems that weather/marine weather condition such as waves and wind are always varied, weather/marine weather conditions are varied per a ship route, a displacement/a trim/the main engine revolution are varied per voyage, property of fuel of marine which is mainly used in ships is varied widely (about 20% in density), and a driving condition of the main engine and a ship condition are varied with time, and there is no means for fuel oil evaluation propulsive performance in actual seas.

Here, patent document 1 discloses a sailing support system of a ship which estimates ship performance in actual seas and feeds back the estimated information to an actual sailing based on data of a sailing monitoring system.

Patent document 2 discloses a performance evaluation system of a ship for evaluation performance of a ship in each voyage using sailing data of a voyage information file and basic information which is inherent to a ship.

Patent document 3 discloses a calculator system which analyzes propulsive performance of a ship based on a data group recorded when a ship sails in actual seas.

Patent document 4 discloses a method for forming a simulation model itself which predicts performance of a ship to minimize a fuel consumption and for improving performance of the ship using the formed model.

PRIOR ART DOCUMENTS

Patent Documents

[Patent Document 1] Japanese Patent Application Laid-open No. 2009-286230
[Patent Document 2] Japanese Patent Application Laid-open No. 2007-296929
[Patent Document 3] Japanese Patent Application Laid-open No. 2018-34585
[Patent Document 4] Japanese Translation of PCT International Application, Publication No. 2015-526778

SUMMARY OF THE INVENTION

Problem to be Solved by the Invention

According to patent document 1, since the ship performance in actual seas is estimated, a sailing condition of an individual target ship is monitored in real time by a sailing monitoring system. Therefore, propulsive performance in actual seas cannot be evaluated before the ship sails.

According to patent document 2, sailing data of a ship is accumulated, and propulsive performance of the ship is evaluated based on the accumulated sailing data. Therefore, propulsive performance in actual seas cannot be evaluated before the ship sails.

According to patent document 3, propulsive performance of a ship is analyzed based on a data group which is recorded when the ship sails in actual seas. Therefore, propulsive performance in actual seas cannot be evaluated before the ship sails.

According to patent document 4, a new dynamic input data set which is to be used in a model using a measurement result collected using a shipboard sensor during operation of a ship. Therefore, propulsive performance in actual seas cannot be evaluated precisely before the ship sails.

Hence, it is an object of the present invention to provide an evaluation method of ship propulsive performance in actual seas, an evaluation program of ship propulsive performance in actual seas and an evaluation system of ship propulsive performance in actual seas capable of precisely evaluating ship propulsive performance in actual seas on the same scale also before the ship sails for example.

Means for Solving the Problem

In an evaluation method of ship propulsive performance in actual seas, a standard sailing model of the ship is set, a sailing condition of the ship and a ship condition of the ship are input to the standard sailing model, the standard sailing model to which the sailing condition and the ship condition are input, and the ship condition are applied to a previously verified calculating method of ship performance in actual seas, and ship propulsive performance in actual seas is evaluated. According to the invention, ship propulsive performance in actual seas can be evaluated also before the ship sails for example. Further, it is possible to precisely evaluate the ship propulsive performance in actual seas by using a previously verified the calculating method of ship performance in actual seas, and it is possible to evaluate ships under the same condition and with the same precision, and it is possible to compare objectively for example.

In an invention, a weather/marine weather condition is input to the standard sailing model as the sailing condition, and ship propulsive performance in actual seas is evaluated using the standard sailing model into which the weather/marine weather condition is input.

According to the invention, for example, when weather/marine weather in accordance with a ship route as a sailing condition is not incorporated, or when a target ship has a sailing policy to navigate while avoiding weather/marine weather which is anticipated to be worse, it is possible to make evaluation which is tailored to reality of the situation by inputting an arbitrary weather/marine weather condition.

In an invention, the method includes a standard sailing model setting step for setting the standard sailing model, a condition inputting step for selecting a ship route, setting a loading condition, setting an evaluation period as sailing conditions, and inputting the ship condition, a ship response calculating step for applying, to the calculating method of ship performance in actual seas, at least one of an external force condition acting on a ship caused by weather/marine weather which differs depending upon the ship route, the external force condition of the ship which differs depending upon the loading condition, and a driving condition of the ship, as well as at least one of change of the external force condition caused by the evaluation period, and change of the driving condition, thereby calculating ship response, and a fuel consumption index deriving step for deriving an index concerning fuel consumption of the ship based on a calculation result of the ship response and an operation mode of a main engine, wherein ship propulsive performance in actual seas is evaluated.

According to the invention, it is possible to evaluate propulsive performance while taking, into consideration, weather/marine weather which is encountered by the ship in actual seas, an external force condition and a driving condition of ship which are different depending upon loading conditions of ships, and change of the external force condition and the driving condition of the ship. Therefore, it is possible to precisely evaluate the ship propulsive performance in actual seas before the ship sails for example. Further, it is possible to precisely evaluate the ship propulsive performance in actual seas as an index concerning fuel consumption, and it is possible to evaluate the fuel consumptions of ships under the same condition and with the same precision, and compare objectively for example.

In an invention, the weather/marine weather which differs depending upon the ship route is used by setting occurrence probability with respect to the weather/marine weather which corresponds to the selected ship route.

According to the invention, the propulsive performance can be evaluated under a condition close to the actual operating condition by setting occurrence probability of the weather/marine weather.

In an invention, an aging deterioration rate including biological fouling of the ship or a propeller which differ depending upon the evaluation period is used as change of the external force condition and the driving condition caused by the evaluation period.

According to the invention, aging deterioration of a ship's hull and a propeller caused by biological fouling is incorporated into a condition by using an aging deterioration rate including the biological fouling, and it is possible to evaluate propulsive performance under a condition which is closer to the actual operating condition.

The aging deterioration rate including the biological fouling includes all of parameter values of aging deterioration related to aging deterioration including the biological fouling, such as slimes and marine organisms adhered to a ship's hull and a propeller, generation of rust and boss, and increase of friction resistance of the ship's hull caused by deterioration of a coating film and reduction of propulsion force and efficiency of a propeller.

In an invention, a deterioration rate of a driving system which drives the ship and which differs depending upon the evaluation period is used as change of the driving condition caused by the evaluation period.

According to the invention, aging deterioration of the driving system is incorporated into the condition by using a deterioration rate of the driving system, and it is possible to evaluate the propulsive performance under a condition which is closer to the actual operating condition.

The deterioration rate of a driving system includes all of parameter values related to a deterioration rate which is different depending upon an evaluation period such as wear and damage of a main engine, an air supply and exhaust system, a fuel supply system, a power transmission system and a propeller.

In an invention, an operation mode of the main engine is based on the driving condition which is set per the loading condition.

According to the invention, the operation mode of the main engine caused by a trim and a draft which is different depending upon a loading condition can be set as the driving condition. Therefore, the operation mode of the main engine can be brought into a condition which is closer to the actual operating condition.

In an invention, operation mode of the main engine and a governor which relate to an operation mode of the main engine are set in the condition inputting step.

According to the invention, the propulsive performance can be evaluated under a condition which is closer to the actual operating condition by setting the operation mode of the main engine and the governor such as an operating position of the main engine related to the operation mode of the main engine in actual seas.

In a main engine which burns fuel, the governor corresponds to a mechanical governor or an electronic governor, and in a main engine which uses electricity, the governor corresponds to an inverter or voltage adjusting means.

In an invention, to derive an index concerning the fuel consumption of the ship, a standard specific fuel consumption or a specific fuel consumption which is input in the condition inputting step are used.

According to the invention, since evaluation can be made under the same condition, a difference caused by fuel quality does not affect the evaluation and it is possible to make evaluation only by ship propulsive performance. Further, it is possible to make evaluation also based on an input of specific fuel consumption which is different from a standard specific fuel consumption.

In an invention, life cycle main engine fuel consumption which is based on a total fuel consumption of the main engine for a long period of the ship is derived as the index concerning the fuel consumption.

According to the invention, propulsive performance when a ship is operated for a long period from several years to several decades can appropriately be evaluated before operation is started for example. A life cycle may be a period from actual service to docking, a period from docking to next docking, or a period during which multiple dockings are assumed.

In an evaluation program of ship propulsive performance in actual seas, a computer is made to read the input of the condition inputting step in the evaluation method of ship propulsive performance in actual seas, the computer is made to execute the ship response calculating step and the fuel consumption index deriving step, and the computer is made to execute an index outputting step for outputting the index concerning the fuel consumption.

According to the invention, it is possible to evaluate propulsive performance while taking, into consideration, weather/marine weather which is encountered by the ship in actual seas, an external force condition and a driving condition of ship which are different depending upon loading conditions of ships, and change of the external force condition and the driving condition of these ships. Therefore, it is possible to provide a program which precisely evaluates the ship propulsive performance in actual seas before the ship sails for example, and which outputs an index concerning the fuel consumption. Further, it is possible to precisely evaluate the ship propulsive performance in actual seas as an index concerning fuel consumption, and it is possible to evaluate the fuel consumptions of ships under the same condition and with the same precision, and compare objectively for example.

In an invention, life cycle main engine fuel consumption which is based on a total fuel consumption of a main engine for a long period of the ship is output as the index concerning the fuel consumption in the index outputting step.

According to the invention, propulsive performance when a ship is operated for a long period from several years to several decades can appropriately be evaluated before sailing for example.

In an invention, at least a condition which is input in the condition inputting step is output in the index outputting step together with the index concerning the fuel consumption.

According to the invention, it becomes easy to consider based on what condition the index concerning the fuel consumption is obtained.

In an evaluation system of ship propulsive performance in actual seas includes standard sailing model setting means for setting a standard sailing model of the ship in actual seas, condition inputting means for selecting a ship route, setting a loading condition, setting an evaluation period as sailing conditions, and inputting a ship condition, ship response calculating means for applying the calculating method of ship performance in actual seas, at least one of an external force condition acting on a ship caused by weather/marine weather which differs depending upon the ship route, the external force condition of the ship which differs depending upon a loading condition, and a driving condition of the ship, as well as at least one of change of the external force condition caused by the evaluation period, and change of the driving condition, thereby calculating ship response, a fuel consumption index deriving means for deriving an index concerning fuel consumption of the ship based on a calculation result of the ship response and an operation mode of a main engine, and fuel consumption index outputting means for outputting the index concerning the fuel consumption.

According to the invention, it is possible to provide the system which evaluates propulsive performance while taking into consideration, weather/marine weather which is encountered by the ship in actual seas, an external force condition and a driving condition of ship which are different depending upon loading conditions of ships, and change of the external force condition and the driving condition of the ship. Therefore, it is possible to precisely evaluate the ship propulsive performance in actual seas before the ship sails for example. Further, it is possible to precisely evaluate the ship propulsive performance in actual seas as an index concerning fuel consumption, and it is possible to evaluate the fuel consumptions of ships under the same condition and with the same precision, and compare objectively for example.

In an invention, the fuel consumption index outputting means outputs the index concerning the fuel consumption together with a condition which is input by the condition inputting means.

According to the invention, it becomes easy to consider based on what condition the index concerning the fuel consumption is obtained.

Effect of the Invention

According to an evaluation method of ship propulsive performance in actual seas of the present invention, ship propulsive performance in actual seas can be evaluated also before the ship sails for example. Further, it is possible to precisely evaluate the ship propulsive performance in actual seas by using a previously verified calculating method of ship performance in actual seas, and it is possible to evaluate ship propulsive performance under the same condition and with the same precision, and it is possible to compare objectively for example.

Further, when a weather/marine weather condition is input into a standard sailing model as a sailing condition and ship propulsive performance in actual seas is evaluated using the standard sailing model into which the weather/marine weather condition is input, if weather/marine weather in accordance with a ship route as the sailing condition is not incorporated for example, or if a target ship has a sailing policy to navigate while avoiding weather/marine weather which is anticipated to be worse, it is possible to make evaluation which is tailored to reality of the situation by inputting an arbitrary weather/marine weather condition.

Further, the evaluation method of ship propulsive performance in actual seas includes a standard sailing model setting step for setting the standard sailing model, a condition inputting step for selecting a ship route, setting a loading condition, setting an evaluation period as sailing conditions, and inputting the ship condition, a ship response calculating step for applying, to the calculating method of ship performance in actual seas, at least one of an external force condition acting on a ship caused by weather/marine weather which differs depending upon the ship route, the external force condition of the ship which differs depending upon the loading condition, and a driving condition of the ship, as well as at least one of change of the external force condition caused by the evaluation period, and change of the driving condition, thereby calculating ship response, and a fuel consumption index deriving step for deriving an index concerning fuel consumption of the ship based on a calculation result of the ship response and an operation mode of a main engine, wherein ship propulsive performance in actual seas is evaluated. According to this, it is possible to evaluate propulsive performance while taking weather/marine weather which is encountered by the ship in actual seas into consideration, an external force condition and a driving condition of ship which are different depending upon loading conditions of ships, and change of the external force condition and the driving condition of the ship. Therefore, it is possible to precisely evaluate the ship propulsive performance in actual seas before the ship sails for example. Further, it is possible to precisely evaluate the ship propulsive performance in actual seas as an index concerning fuel consumption, and it is possible to evaluate the fuel consumptions of ships under the same condition and with the same precision, and compare in objectively for example.

The weather/marine weather which differs depending upon the ship route is used by setting occurrence probability with respect to the weather/marine weather which corresponds to the selected ship route. According to this, the propulsive performance can be evaluated under a condition close to the actual operating condition by setting occurrence probability of the weather/marine weather.

An aging deterioration rate including biological fouling of the ship's hull or a propeller which differ depending upon the evaluation period is used as change or the external force condition and the driving condition caused by the evaluation period. According to this, aging deterioration of a ship's hull and a propeller caused by biological fouling is incorporated into a condition by using an aging deterioration rate including the biological fouling, and it is possible to evaluate propulsive performance under a condition which is closer to the actual operating condition.

A deterioration rate of a driving system which drives the ship and which differs depending upon the evaluation period is used as change of the driving condition caused by the evaluation period. According to this, aging deterioration of the driving system is incorporated into the condition by using a deterioration rate of the driving system, and it is possible to evaluate the propulsive performance under a condition which is closer to the actual operating condition.

The operation mode of the main engine is based on a driving condition is set per a loading condition. According to this, the operation mode of the main engine caused by a trim and a draft which is different depending upon a loading condition can be set as the driving condition. Therefore, the operation mode of the main engine can be brought into a condition which is closer to the actual operating condition The operation mode of the main engine and a governor which relate to an operation mode of the main engine are set in the condition inputting step. According to this, the propulsive performance can be evaluated under the condition which is closer to the actual operating condition by setting the operation mode of the main engine and the governor such as an operating position of the main engine related to the operation mode of the main engine in actual seas.

To derive an index concerning the fuel consumption of the ship, a standard specific fuel consumption or a specific fuel consumption which is input in the condition inputting step are used. According to this, since evaluation can be made under the same condition, a difference caused by fuel quality does not affect the evaluation and it is possible to make evaluation only by ship propulsive performance. Further, it is possible to make evaluation also based on an input of specific fuel consumption which is different from a standard specific fuel consumption.

Further, life cycle main engine fuel consumption which is based on a total fuel consumption of the main engine for a long period of the ship is derived as the index concerning the fuel consumption. According to this, propulsive performance when the ship is operated for a long period from several years to several decades can appropriately be evaluated before operation is started for example.

According to an evaluation program of ship propulsive performance in actual seas of the present invention, it is possible to evaluate propulsive performance while taking weather/marine weather which is encountered by the ship in actual seas into consideration which is encountered by the ship in actual seas, an external force condition and a driving condition of ship which are different depending upon loading conditions of ships, and change of the external force condition and the driving condition of the ship. Therefore, it is possible to provide a program which precisely evaluates the ship propulsive performance in actual seas before the ship sails for example, and which outputs an index concerning fuel consumption. Further, it is possible to precisely evaluate the ship propulsive performance in actual seas as an index concerning fuel consumption, and it is possible to evaluate the fuel consumptions of ships under the same condition and with the same precision, and compare in objectively for example.

Further, life cycle main engine fuel consumption which is based on a total fuel consumption of a main engine for a long period of the ship is output as the index concerning the fuel consumption in the index outputting step. According to this, propulsive performance when the ship is operated for a long period from several years to several decades can appropriately be evaluated before sailing for example.

At least a condition which is input in the condition inputting step is output in the index outputting step together with the index concerning the fuel consumption. According to this, it becomes easy to consider based on what condition the index concerning the fuel consumption is obtained.

Further, according to an evaluation system of ship propulsive performance in actual seas of the present invention, it is possible to provide the system which evaluates propulsive performance while taking weather/marine weather which is encountered by the ship in actual seas, into consideration, an external force condition and a driving condition of ship which are different depending upon loading conditions of ships, and change of the external force condition and the driving condition of the ship. Therefore, it is possible to precisely evaluate the ship propulsive performance in actual seas before the ship sails for example. Further, it is possible to precisely evaluate the ship propulsive performance in actual seas as an index concerning fuel consumption, and it is possible to evaluate the fuel consumptions of ships under the same condition and with the same precision, and compare objectively for example.

The fuel consumption index outputting means outputs the index concerning the fuel consumption together with a condition which is input by the condition inputting means. According to this, it becomes easy to consider based on what condition the index concerning the fuel consumption is obtained.

MODE FOR CARRYING OUT THE INVENTION

An evaluation method of ship propulsive performance in actual seas, an evaluation program of ship propulsive performance in actual seas and an evaluation system of ship propulsive performance actual seas according to embodiments of the present invention will be described below.

Figure 1:
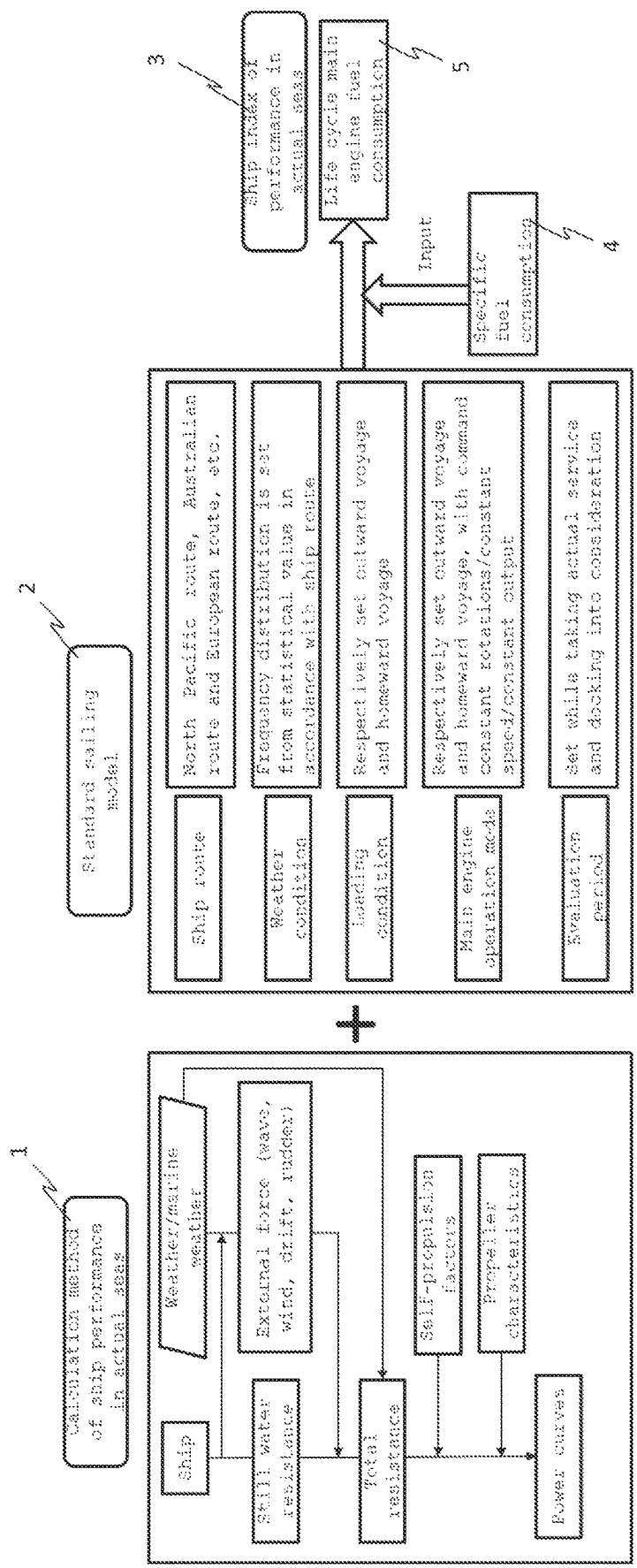
FIG. 1 is a conceptual diagram of evaluation of ship propulsive performance in actual seas according to an embodiment of the present invention.

FIG. 1 is a conceptual diagram of evaluation of ship propulsive performance in actual seas showing a conception of the evaluation method of ship propulsive performance in actual seas according to the embodiment. FIG. 1 shows a flow in which a previously verified calculating method 1 of ship performance in actual seas is prepared, and a ship propulsive performance index 3 for evaluating ship propulsive performance in actual seas is obtained using a standard sailing model 2.

The previously verified calculating method 1 of ship performance in actual seas is a method in which all or a portion of a basic calculating method of ship performance in actual seas is previously sophisticated and verified as a calculating method, up to a level at which the ship propulsive performance index 3 which evaluates ship propulsive performance in actual seas is obtained, based on data obtained in actual seas, a simulation technique which is tailored to actual seas, or propulsive performance of an actual ship in actual seas.

As the ship propulsive performance index 3, life cycle main engine fuel consumption 5 can be obtained by applying a specific fuel consumption 4. It is also possible to obtain a result of calculation, as the ship propulsive performance index 3, which is carried out using the calculating method 1 of ship performance in actual seas in accordance with a setting condition as a standard specific fuel consumption of the standard sailing model 2 without applying the specific fuel consumption 4.

The calculating method 1 of ship performance in actual seas can apply waves, wind, ocean current, tidal current and the like as an external force factor which is caused by weather/marine weather encountered in actual seas, or an external force which is varied by drift, rudder and the like of a ship corresponding to the weather/marine weather to still water resistance as an external force acting on the ship for example, the calculating method 1 of ship performance in actual seas can calculate total resistance, and power curves obtained while taking propeller characteristics into consideration can be used in self-propulsion factors. To enhance the precision of the calculating method 1 of ship performance in actual seas, it is possible to use various data obtained through actual ship monitoring acquired from actually sailing various kinds of ships, and data obtained through standard test in an actual seas model basin which emulates actual seas condition. It is also possible to reflect enhancement of precision through a model test technique and a calculating technique of an element which exerts influence on operating in actual seas such as added resistance in waves, self-propulsion factors in waves and wind resistance of a superstructure.

As described above, as the previously verified calculating method 1 of ship performance in actual seas, it is possible to use a calculating method which is optimized from various data obtained in actual seas, a calculating method based on a simulation technique which is verified and evaluated by applying the technique in actual seas, or an evaluated calculating method while being compared with attained propulsive performance in actual seas.

By making attempt to enhance the precision of the calculating method 1 of the ship propulsive performance in actual seas, it is possible to evaluate actual ability of the ship in actual seas as an objective index (a ruler).

In the standard sailing model 2, it is applied to the calculating method 1 of the ship propulsive performance in actual seas, the ship propulsive performance index 3 of performance in actual seas can be obtained while taking, into consideration, setting of a ship route where the ship sails, an external force condition acting on the ship caused by a difference of the weather/marine weather caused by the set ship route, an external force condition and a driving condition caused by trim and draft which differs depending upon the setting of a loading condition, a driving condition which is different depending on the setting of ship's speed on a outward voyage and a homeward voyage, the setting of an operation mode of the main engine which coordinates with the latter driving condition, variation of the external force condition and the driving condition caused by aging deterioration which differs depending upon length of an actual service period caused by the setting of an evaluation period, and variation of the external force condition and the driving condition which is attributable to biological fouling caused by adhesion of marine organism which is different depending upon the actual service period and the docking interval.

According to this, concerning the individual ship or a fleet, it is possible to evaluate actual ability of the ship in actual seas using the ship performance in actual seas when the ship sails actual seas as the objective index (a ruler), and it is possible to utilize the evaluation for sailing in actual seas or comparing the actual ability of the ship in actual seas.

Figure 2:
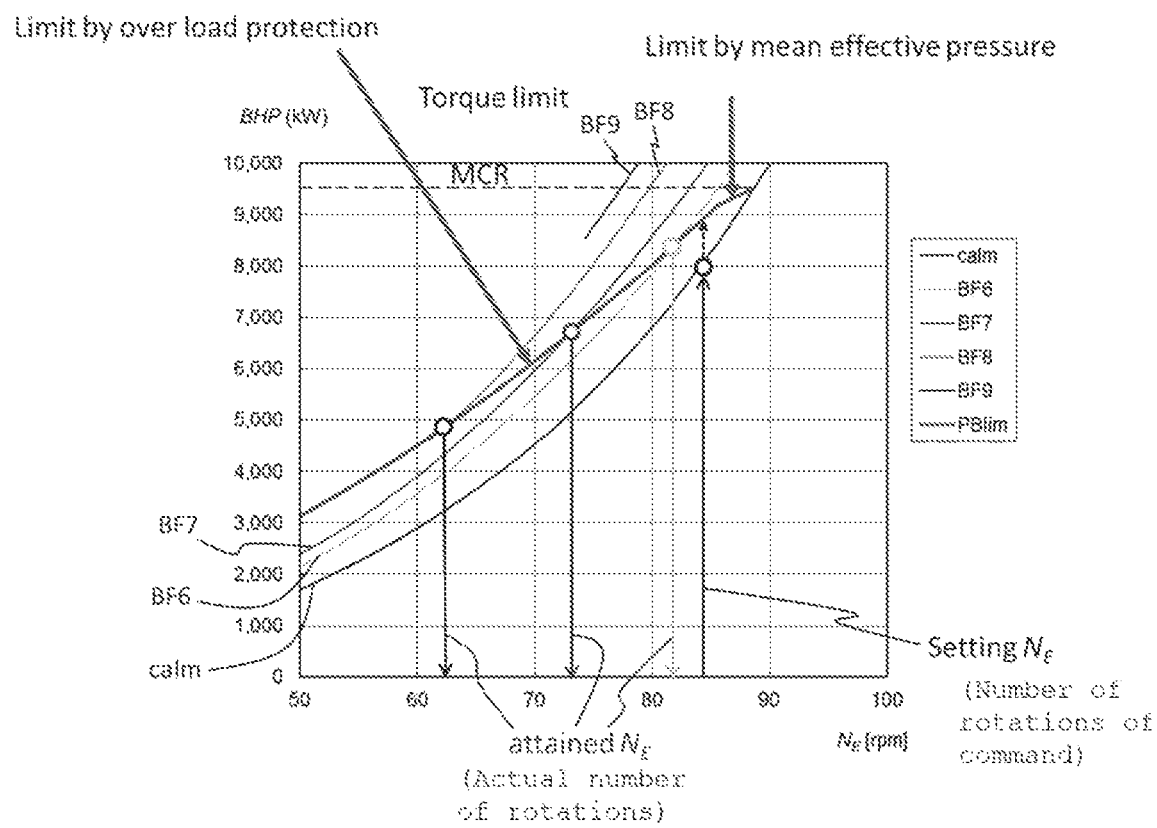
FIG. 2 is a diagram showing an example of characteristics of main engine output with respect to the main engine revolution with operation limits.

FIG. 2 is a diagram showing an example of characteristics of the main engine output with respect to the main engine revolution with operation limits.

Usually, in ships, main engine operation limits line made by mean effective pressure, an overload protection device are defined as an upper limit of the operation of the main engine, but there are some ships in which in addition to this, an upper limit of a fuel injection is designated by an fuel index. (fuel index, "FI", hereinafter), and if the fuel injection exceeds the upper limit, operation to reduce the number of the engine revolution is executed.

The FI is the fuel injection, and the value at the maximum continuous rating (NCR) is defined as 100%. By designating the upper limit of the FI with respect to the main engine revolution, it is possible to obtain an operating position of the main engine which is tailored to the operation limit line of the main engine made by FI. As an example of this, FIG. 2 shows characteristics of main engine output (BHP) with respect to the main engine revolution ($N_E$). In FIG. 2, the abscissa shows the main engine revolution ($N_E$) [rpm], and the ordinate shows main engine output (BHP) [kW]. This characteristic diagram can be obtained as power curves of a ship based on the calculating method 1 of ship performance in actual seas which assumes a specific ship in actual seas.

Here, BF is the Beaufort scale which is a scale of wind speed for classifying strength of wind in actual seas, and calm means when calm weather condition, and wind speed becomes higher as BF becomes greater.

Figure 3:
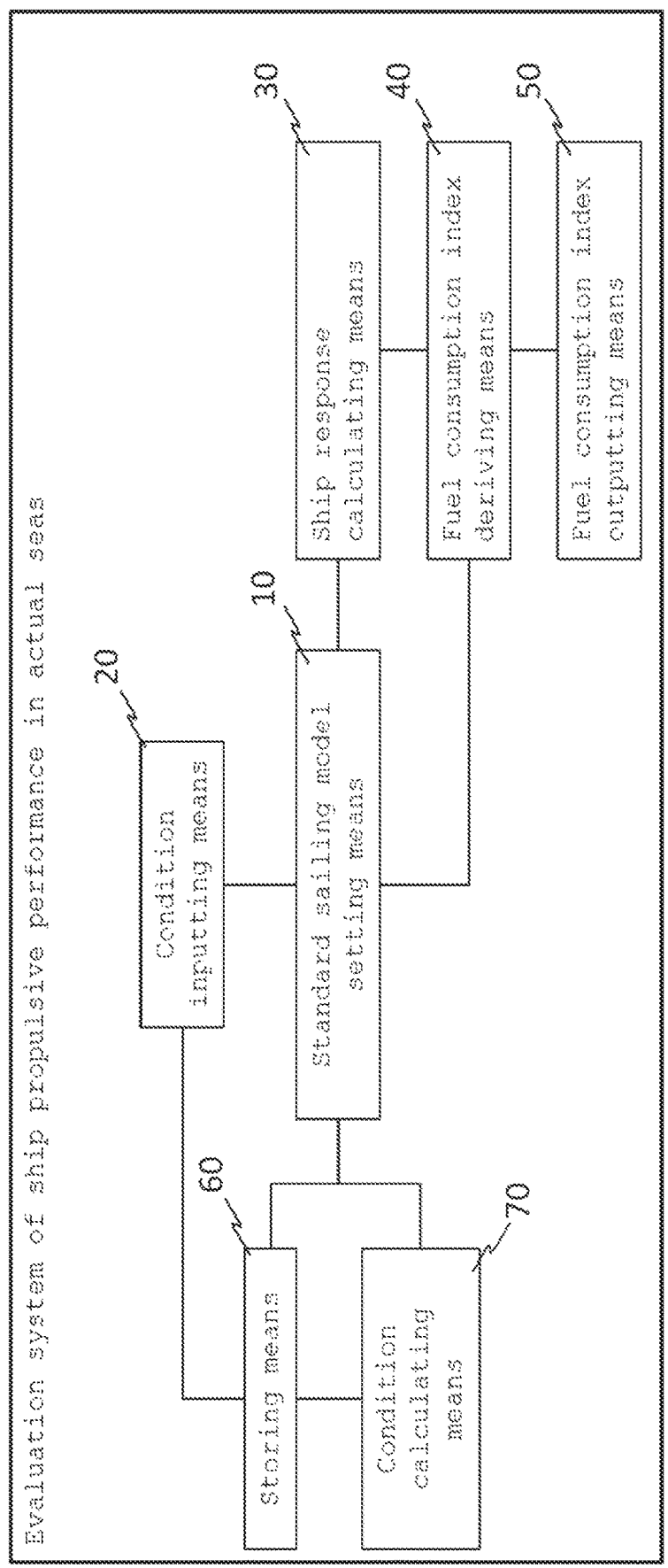
FIG. 3 is a block diagram of an evaluation system of ship propulsive performance in actual seas.

FIG. 3 is a block diagram of the evaluation system of ship propulsive performance in actual seas according to the embodiment.

The evaluation system of ship propulsive performance in actual seas includes standard sailing model setting means 10, condition inputting means 20, ship response calculating means 30, fuel consumption index deriving means 40, fuel consumption index outputting means 50, storing means 60 and condition calculating means 70.

The standard sailing model 2 is set using the standard sailing model setting means 10. Using the condition inputting means 20, a ship route is selected, a loading condition is set, an evaluation period is set as sailing conditions, and a ship condition is input. Using the ship response calculating means 30, at least one of an external force condition acting on a ship caused by weather/marine weather which differs depending upon the ship route, the external force condition of the ship which differs depending upon the loading condition, and a driving condition of the ship, as well as at least one of change of the external force condition caused by the evaluation period, and change of the driving condition are applied to the calculating method 1 of ship performance in actual seas to calculate ship response. Using the fuel consumption index deriving means 40, an index concerning fuel consumption of a ship is derived as the ship propulsive performance index 3 based on a calculation result of the ship response and an operation mode of the main engine. According to this, it is possible to evaluate propulsive performance in which weather/marine weather which is encountered by the ship in actual seas, the external force condition and the driving condition of the ship which differs depending upon the loading condition of the ship, and change of the external force condition and the driving condition of the ship. Therefore, it is possible to precisely evaluation the ship propulsive performance in actual seas before the ship sails for example. It is possible to precisely evaluate the ship propulsive performance in actual seas as an index concerning fuel consumption, and it is possible to compared objectively fuel economies of ships under the same condition and with the same precision for example.

The evaluation of ship propulsive performance in actual seas can also be utilized for determination of selection of a ship course or change fuel not only before the ship sails but while the ship sails, evaluation of the voyage and evaluation of the calculating method 1 of ship performance in actual seas by comparing between an index concerning fuel consumption derived after the ship sails and an index calculated from an actually consumed fuel amount. It is possible to calculate the ship response using the calculating method 1 of ship performance in actual seas, and only to evaluate the propulsive performance of the ship in actual seas.

The condition inputting means 20 can commonly be used for inputting arbitrary weather/marine weather condition by a user as will be described later, and a biological fouling rate.

Selection of a ship route, setting of the loading condition, setting an evaluation period, and input of a ship condition can appropriately change the selection, the setting and the input.

Figure 4:
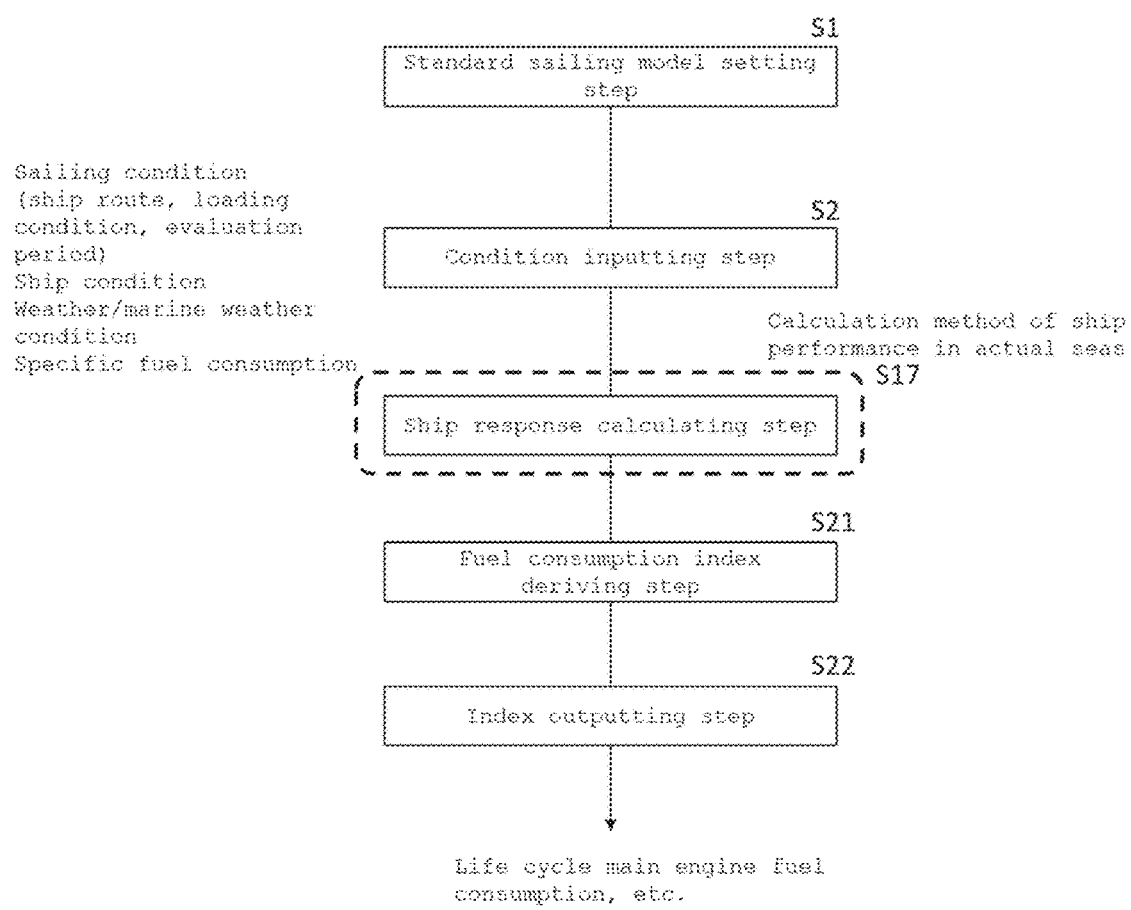
FIG. 4 is a simplified flow chart of a ship propulsive performance in actual seas evaluation method.

FIG. 4 is a simplified flow chart of the evaluation method of ship propulsive performance in actual seas according to the embodiment.

Figure 5:
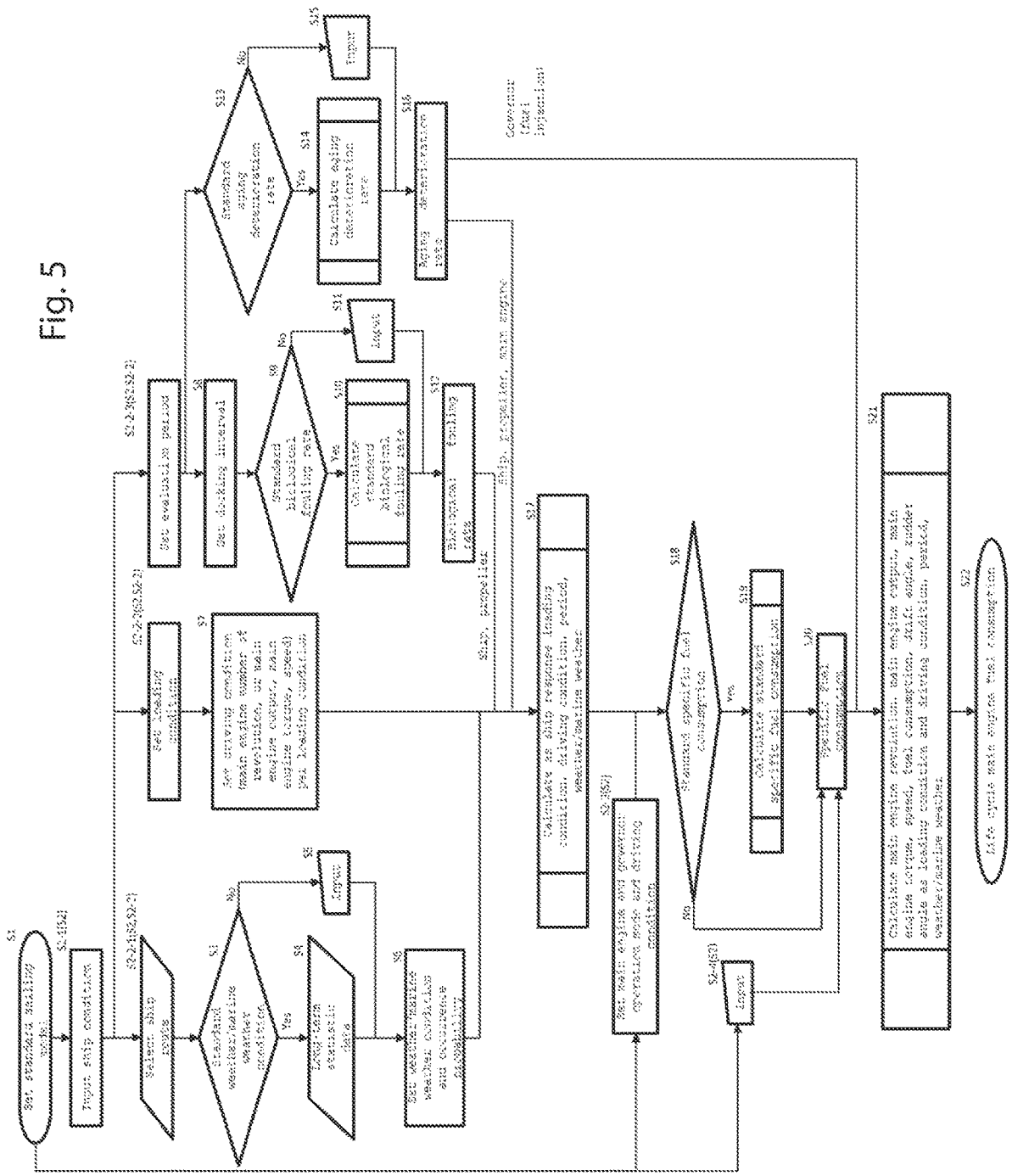
FIG. 5 is a detailed flow chart of a ship propulsive performance in actual seas evaluation method.

FIG. 5 is a detailed flow chart of the evaluation method of ship propulsive performance in actual seas according to the embodiment.

The evaluation system of ship propulsive performance in actual seas includes a computer in which the evaluation program of ship propulsive performance in actual seas is incorporated, and executes processing in the following steps.

First, the standard sailing model 2 of a ship in actual seas is read in the computer by the standard sailing model setting means 10, and a model is set (standard sailing model setting step S1). The standard sailing model 2 is a standard sailing model used when ship propulsive performance in actual seas is evaluated.

After the standard sailing model setting step S1, selection of the ship route, setting of the loading condition, setting of the evaluation period, and input of the ship condition of the ship as the sailing conditions are received from the user.

As condition inputting step S2, the user inputs the ship condition using the condition inputting means 20 (ship condition inputting step S2-1), and selects the ship route, sets the loading condition and sets the evaluation period using the condition inputting means 20 (sailing condition inputting step 32-2) as the sailing condition.

In the sailing condition inputting step S2-2, ship route selecting step S2-2-1 for selecting the ship route, and loading condition setting step S2-2-2 for setting the loading condition, and evaluation period setting step S2-2-3 for setting the evaluation period are carried out. According to this, the ship route, the loading condition and the evaluation period are set in the standard sailing model 2.

It is possible to set any one or two of the ship route, the loading condition and the evaluation period. In this case, the condition which is not set is automatically set to a fixed condition.

In the condition inputting step S2, setting of the operation mode of the main engine and the governor are received from the user per the loading condition and the driving condition. The user sets the operation mode of the main engine and the governor related to the operating position of the main engine for each of the outward voyage and the homeward voyage using the condition inputting means (operation mode setting step S2-3). The operation mode of the main engine and the governor are constant of engine revolution, constant output of the main engine, constant ship speed, fuel index limit and the like. By setting the operation mode of the main engine and the governor such as the operating position of the main engine related to the operation mode of the main engine in actual seas, it is possible to evaluate the propulsive performance under a condition closer to the actual operating condition.

In the condition inputting step S2, input of the specific fuel consumption is received from the user. The user inputs an arbitrary specific fuel consumption using the condition inputting means 20 (specific fuel consumption inputting step. S2-4).

In the ship route selecting step S2-2-1, the user selects one or more of ship routes from the ship routes stored in the storing means 60. Examples of the ship routes are a North Pacific route, an Australian route and a European route, etc.

If a ship route is selected in the ship route selecting step S2-2-1, selection whether probability standard weather/marine weather condition is used for setting the weather/marine weather condition and the occurrence probability for the selected ship route is received from the user (standard weather/marine weather condition selecting step S3). By setting the occurrence probability of the weather/marine weather, it is possible to evaluate the propulsive performance under a condition which is closer to the actual operating condition. As the occurrence probability of the weather/marine weather, frequency distribution is set from a statistical value in accordance with a ship route for example.

In the standard weather/marine weather condition selecting step S3, when it is selected to use the standard weather/marine weather condition, long-term statistic data corresponding to a ship route selected in the ship route selecting step S2-2-1 is extracted from the long-term statistic data of the standard weather/marine weather condition stored in the storing means 60 (long-term statistic data extracting step S4).

Based on the long-term statistic data extracted in the long-term statistic data extracting step S4, the state of the weather/marine weather and the occurrence probability of the weather/marine weather condition are set to a ship route selected in the ship route selecting step S2-2-1 (weather/marine weather and occurrence probability setting step S6). The user can arbitrarily set the occurrence probability.

On the other hand, if it is selected not to use the standard weather/marine weather in the standard weather/marine weather condition selecting step S3, input of the weather/marine weather condition is received from the user. The user inputs an arbitrary weather/marine weather condition using the condition inputting means 20 (weather/marine weather condition inputting step S5). If the arbitrary weather/marine weather condition is input, the procedure is shifted to the weather/marine weather and occurrence probability setting step S6.

It is easier for the user to use the standard weather/marine weather, but for a ship having a sailing policy to navigate while avoiding a ship route in which weather/marine weather which is anticipated to be worse, there is a case where usage of an arbitrary weather/marine weather condition is more tailored to reality of the situation.

Data concerning the weather/marine weather condition and the occurrence probability per a ship route which are set in the weather/marine weather and occurrence probability setting step S6 are sent to the ship response calculating means 30.

In the loading condition setting step S2-2-2, the user sets a loading condition such as a full loaded condition and a ballast condition for each of the outward voyage and the homeward voyage. It is also possible to set multiple loading conditions for the outward voyage and the homeward voyage such as changing the loading condition per a discharge port.

If the loading condition is set in the loading condition setting step S2-2-2, setting of the driving condition per the loading condition is received from the user. If the loading condition is set, draft is determined, and an external force condition of the ship which is varied in accordance with the draft is set. The user inputs at least one of the main engine revolution, the main engine output, the main engine torque and speed using the condition inputting means 20 as a driving condition (driving condition setting step S7). The operation mode of the main engine is based on the driving condition which is set per the loading condition. Since the operation mode of the main engine which is attributable to the trim and the draft which differs depending upon the loading condition can be set as the driving condition, the operation mode of the main engine can be brought to a condition which is closer to the actual operating condition. Based on the assumption that the driving condition is changed in some cases in accordance with variation of a status halfway through voyage, it is also possible to set multiple driving conditions with respect to one loading condition. According to this, it is possible to evaluate and compare propulsive performance under various driving conditions. It is also possible to even out the loading condition and change only the driving condition, and even out the driving condition and change only the loading condition.

Data of the driving condition per the loading condition which is set in the driving condition setting step S7 is sent to the ship response calculating means 30.

In the evaluation period setting step S2-2-3, the user sets a period during which ship propulsive performance in actual seas is evaluated. The evaluation period is a life cycle of the ship, and the evaluation period is generally set from several years to several decades, but the life cycle may be a period from actual service to docking, a period from docking to next docking, or a period during which multiple dockings are assumed.

After the actual service, resistance of a ship is increased by attachment of marine organism or rust, and deterioration of a coating film, and an external force condition acting on a ship is varied. The driving condition is changed by wear and loosening of various portions of the main engine, and wear and damage of an air supply and exhaust system, a fuel supply system, a power transmission system and a propeller. They can be recovered in some cases by docking and receiving maintenance, but cannot be recovered in some cases as aging deterioration. In the evaluation period setting step S2-3, a setting operation in which these are taken into consideration is carried out.

If the evaluation period is set in the evaluation period setting step S2-2-3, setting of a docking interval, and selection whether standard aging deterioration rate is used are received from the user.

The user sets the docking interval (docking interval setting step S8), and selects whether the standard aging deterioration rate is used (standard aging deterioration rate selecting step S13) using the condition inputting means 20.

In the docking interval setting step S8, the user sets the interval during which the ship docks for maintenance.

If the docking interval is set in the docking interval setting step S8, selection whether a standard biological fouling rate is used for setting a biological fouling rate used when defacement such as ship's hull caused by attachment of slims and marine organisms such as Balanomorpha is estimated is received from the user (standard biological fouling ratio selecting step S9).

In the standard biological fouling ratio selecting step S9, if usage of the standard biological fouling ratio is selected, the condition calculating means 70 calculates a standard biological fouling rate based on the evaluation period and the like (standard biological fouling rate calculating step 10).

Based on the standard biological fouling rate which is derived by calculation, the biological fouling rate is set for the respective ship's hull and propeller (biological fouling rate setting step S12). By setting the biological fouling rate as one of variations of the external force condition and the driving condition in the set evaluation period, aging deterioration of the ship's hull and the propeller caused by the biological fouling is incorporated into the condition, and it is possible to evaluate the propulsive performance under a condition which is closer to the actual operating condition. The biological fouling rate includes parameter values of all of aging deteriorations related to aging deterioration including biological fouling, and examples of such parameter values are biofouling on the ship's hull and the propeller, generation of rust and boss, increase of a friction resistance the ship's hull caused by deterioration of a coating film and reduction of propulsion efficiency of the propeller.

On the other hand, if it is selected not to use the standard biological fouling rate in the standard biological fouling ratio selecting step S9, input of the biological fouling rate is received from the user. The user inputs arbitrary biological fouling rate using the condition inputting means 20 (biological fouling rate inputting step S11). If the arbitrary biological fouling rate is input, the procedure is shifted to the biological fouling rate setting step S12.

It is easier for the user to use the standard biological fouling rate, but degrees of defacement on a ship's hull and a propeller and restoration are varied depending upon a maintenance method and existence or non-existence of marine organism biofouling preventing means. Therefore, if arbitrary biological fouling rate is used, it is possible to make evaluation tailored to reality of the situation in some cases. It is also possible for the user to correct a standard biological fouling rate which is obtained by calculation.

Data of the biological fouling rates of the ship's hull and the propeller which are set in the biological fouling rate setting step S12 is sent to the ship response calculating means 30.

If it is selected to use the standard aging deterioration rate in the standard aging deterioration rate selecting step S13, the condition calculating means 70 calculates the standard aging deterioration rate (standard aging deterioration rate calculating step S14).

Based on the standard aging deterioration rate which is derived by calculation, aging deterioration rates are set for the respective ship, the propeller, the main engine and the governor (aging deterioration rate setting step S16). By setting the deterioration rates of the ship and the driving system as one of variations of the external force condition and the driving condition in a set evaluation period, the aging deterioration of the driving system is incorporated into the condition, and it is possible to make evaluation of the propulsive performance under a condition which is closer to the actual operating condition.

In a main engine which burns fuel, the governor corresponds to a mechanical governor or an electronic governor, and in a main engine which uses electricity, the governor corresponds to an inverter or voltage adjusting means. A deterioration rate of the driving system includes all of parameter values related to deterioration rates which differs depending upon evaluation periods such as wear and damage of the main engine, the air supply and exhaust system, the fuel supply system, the power transmission system and the propeller.

On the other hand, if it is selected not to use the standard aging deterioration rate in the standard aging deterioration rate selecting step S13, input of the aging deterioration rate is received from the user. The user inputs arbitrary aging deterioration rate using the condition inputting means 20 (aging deterioration rate inputting step S15). If the arbitrary aging deterioration rate is input, the procedure is shifted to the aging deterioration rate setting step S16.

It is easier for the user to use the standard aging deterioration rate, but since a degree of the aging deterioration is varied depending upon a maintenance method and performance of a device, if arbitrary aging deterioration rate is used, it is possible to make evaluation which is more tailored to reality of the situation in some cases. The user can also correct the standard aging deterioration rate which is obtained by calculation.

Among data of the aging deterioration rate which is set in the aging deterioration rate setting step S16, data of the aging deterioration rates of the ship, the propeller and the main engine is sent to the ship response calculating means 30, and the aging deterioration rate of the governor which exerts influence on the fuel injection is sent to the fuel consumption index deriving means 40.

The ship response calculating means 30 calculates a ship response of each of the loading condition and the driving condition, the evaluation period and the weather/marine weather based on a state and occurrence probability of the weather/marine weather of the ship route, a driving condition per the loading condition, the biological fouling rate of the ship's hull and the propeller, and data of the aging deterioration rates of the ship, the propeller and the main engine (ship response calculating step S17).

In the calculation of the ship response, a relation between the main engine output, the main engine revolution and speed through the water in actual seas per evaluation period from external force such as still water resistance, self-propulsion factors in still water, open water characteristics of the propeller, wind forces, steady forces in waves, self-propulsion factors in waves, drift foces, rudder forces, the biological fouling rate, and aging deterioration rate.

In the calculation executed by the ship response calculating means 30, a fuel consumption of the main engine and operation mode of the main engine are not put into consideration. Therefore, it is possible to calculate the ship response from which influence of the specific fuel consumption of the main engine and the actuation characteristics of the main engine are removed.

The calculating method 1 of ship performance in actual seas which is applied to the calculation of the ship response is a calculating method which is previously verified based on data collected by mounting a monitoring device in an actual ship and data obtained by a test result of a tank test carried out by a model ship. If the previously verified calculating method 1 of ship performance in actual seas is used, it is possible to precisely evaluate the ship propulsive performance in actual seas, and it is possible to evaluate ships under the same condition and with the same precision, and it is possible to compare objectively. The previously verified calculating method 1 of ship performance in actual seas includes all of a calculating method which is optimized from various data sets obtained in actual seas, a calculating method based on a simulation technique which is verified and evaluated by applying the same in actual seas, and a calculating method which is compared with attained propulsive performance in actual seas and which is evaluated and sophisticated.

After the ship response calculating step S17, selection whether the amount of standard fuel consumption should be used for setting the specific fuel consumption 4 is received from the user (standard specific fuel consumption selecting step S18).

If it is selected to use the standard specific fuel consumption in the standard specific fuel consumption selecting step S18, the condition calculating means 70 calculates the standard specific fuel consumption (standard specific fuel consumption calculating step S19).

A specific fuel consumption (SFC) 4 is set based on the standard specific fuel consumption which is derived by calculation (specific fuel consumption setting step S20).

On the other hand, if it is selected not to use the standard specific fuel consumption in the standard specific fuel consumption selecting step S18, arbitrary specific fuel consumption which is input in the specific fuel consumption inputting step S2-4 is read. According to this, it is possible to make evaluation also by arbitrary specific fuel consumption which is different from the standard specific fuel consumption. If the arbitrary specific fuel consumption is read, the procedure is shifted to the specific fuel consumption setting step S20.

It is easier for the user to use the standard specific fuel consumption, but if the arbitrary specific fuel consumption is used, it is possible to make evaluation which is more tailored to reality of the situation in some cases. The user can also correct a specific fuel consumption which is obtained by calculation. It is also possible to set a multiple specific fuel consumption 4. For example, it is also possible to the specific fuel consumption 4 according to kinds of fuel such as Marine Diesel oil, Marine Fuel oil and gas fuel, and set a multiple specific fuel consumption 4 while taking a difference of property into consideration even if the king of fuel is the same.

Data of the specific fuel consumption which is set in the specific fuel consumption setting step S20 is sent to the fuel consumption index deriving means 40.

The Marine Fuel oil which is mainly used in ships has variation in property depending upon production area and a difference of density of about 20% is generated. Therefore, there is a problem that conditions for evaluating the propulsive performance are unequal. However, for deriving the index concerning the fuel consumption of a ship as in this embodiment, by inputting and setting the specific fuel consumption 4 using the standard specific fuel consumption or arbitrary specific fuel consumption, it is possible to evaluate under the same condition. Therefore, a difference caused by fuel quality does not affect the evaluation, and it is possible to evaluate only by ship propulsive performance. In the calculation carried out by the ship response calculating means 30, it is also possible to calculate ship performance in actual seas of an individual ship while taking a specific fuel consumption of the main engine and operation mode of the main engine into consideration.

The fuel consumption index deriving means 40 calculates the main engine number of revolution, the main engine output, the main engine torque, speed, a fuel consumption, drift angle and a rudder angle as a loading condition, a driving condition, evaluation period and weather/marine weather based on the set specific fuel consumption 4 and the aging deterioration rate of the governor and the like, and the fuel consumption index deriving means 40 derives an index concerning the fuel consumption of the ship as the ship propulsive performance index 3 of performance in actual seas (fuel consumption index deriving step S21).

The index concerning the fuel consumption can be derived as the life cycle main engine fuel consumption 5 which shows fuel consumption of the main engine which is calculated from a total fuel consumption of the main engine, a total transportation distance and a total load capacity for a long period of the ship which is set as the evaluation period. By deriving the index concerning the fuel consumption as the life cycle main engine fuel consumption 5, it is possible to appropriately evaluate propulsive performance when the ship is operated for a long period from several years to several decades before the operation of the ship is started for example. The index concerning the fuel consumption includes, in addition to the life cycle main engine fuel consumption 5, fuel consumption of the main engine calculated from the total fuel consumption of the main engine, the total transportation distance and the total load capacity for the evaluation period, and any unit can be selected as a unit of the fuel consumption. A life cycle may be a period from actual service to docking, a period from docking to next docking, or a period during which multiple dockings are assumed.

The fuel consumption index outputting means 50 outputs the index concerning the fuel consumption derived in the fuel consumption index deriving step S21 to a screen or paper (index outputting step S22).

The fuel consumption index outputting means 50 also outputs a condition which is input in at least the condition inputting step S2 together with the index concerning the fuel consumption. According to this, it becomes easy for the user to consider under what condition the index concerning the fuel consumption is derived.

As described above, the standard sailing model 2 of the ship in actual seas is set, a sailing condition of the ship and a ship condition of the ship are input to the standard sailing model 2, the standard sailing model 2 into which the sailing condition and the ship condition are input and the ship condition are applied to the previously verified calculating method 1 of ship performance in actual seas, and ship propulsive performance in actual seas is evaluated. According to this, it is possible to precisely evaluate the ship propulsive performance in actual seas also, for example, before the ship sails.

Further, a weather/marine weather condition is input to the standard sailing model 2 as a sailing condition, and ship propulsive performance in actual seas is evaluated using the standard sailing model 2 into which the weather/marine weather condition is input. According to this, when the weather/marine weather which is tailored to the ship route as the sailing condition is not incorporated for example, or when a ship having the sailing policy such as navigation while avoiding weather/marine weather which is anticipated to become worse is a target, it is possible to evaluate in a manner more tailored to reality of the situation by inputting arbitrary weather/marine weather condition.

A providing system of ship performance in actual seas as another embodiment of the present invention will be described next.

Like the evaluation of ship propulsive performance in actual seas shown in FIG. 1, this system obtains a ship propulsive performance index 3 of performance in actual seas which evaluates performance of a ship in actual seas using a previously verified calculating method 1 of ship performance in actual seas and a standard sailing model 2 of the ship.

As the ship propulsive performance index 3, it is possible to obtain a life cycle main engine fuel consumption 5 as the ship propulsive performance index 3 by applying a specific fuel consumption 4. It is also possible to obtain, together with the ship propulsive performance index 3 a calculation result which is carried out using the calculating method 1 of ship performance in actual seas which is tailored to a setting condition of the standard sailing model 2 without applying the specific fuel consumption 4.

The calculating method 1 of ship performance in actual seas can apply waves, wind, ocean current, tidal current and the like as an external force factor which is caused by weather/marine weather encountered in actual seas, or an external force which is varied by drift, rudder and the like of a ship corresponding to the weather/marine weather to still water resistance as an external force acting on the ship for example, the calculating method 1 of ship performance in actual seas can calculate total resistance, and power curves obtained while taking propeller characteristics into consideration can be used in a self-propulsion factors.

The precision of the calculating method 1 of ship propulsive performance in actual seas can be enhanced by using various data obtained through actual ship monitoring data acquired from actually sailing various kinds of ships, and data obtained through standard test in an actual seas model basin which emulates a real sea condition. It is also possible to precisely obtain an element which exerts influence on sailing in real sea condition such as added resistance in waves, self-propulsion factors in waves and wind resistance of a superstructure through a model test technique and a calculating technique, and it is possible to reflect the same to the calculating method 1 of ship performance in actual seas to enhance the precision.

As described above, as the previously verified calculating method 1 of ship performance in actual seas, it is possible to use a calculating method which is optimized from various data obtained in actual seas, a calculating method based on a simulation technique which is verified and evaluated by applying the technique in actual seas, or an evaluated and sophisticated calculating method while being compared with attained propulsive performance in actual seas.

By making attempt to enhance the precision of the calculating method 1 of ship performance in actual seas, reliability of the ship propulsive performance index 3 of performance in actual seas which becomes an objective index (a ruler) when the actual ability of the ship in actual seas is evaluated is enhanced.

In the standard sailing model 2, it is applied to the calculating method 1 of ship performance in actual seas, and the ship propulsive performance index 3 can be obtained while taking into consideration, the setting of the ship route, external forces acting on the ship in accordance with the weather/marine weather which differs depending upon the ship route, external forces condition and a driving condition tailored to a draft and a trim which differ depending upon the setting of the loading condition, a driving condition tailored to the setting of the ship speed in the outward voyage and the homeward voyage, the setting of the operation mode of the main engine which is associated with the driving condition, variations of the external force condition and the driving condition caused by aging deterioration which differs depending upon a length of the actual service period caused by setting of the evaluation period, and the external force condition and the driving condition which are attributable to the biological fouling caused by attachment of slimes and marine organism which differs depending upon the actual service period and docking interval.

According to this, it is possible to evaluate actual ability of the ship in actual seas using the ship propulsive performance index 3 when the ship sails in actual seas as the objective index (a rule), and it is possible to utilize the evaluation for sailing of indivisual ship in actual seas and for comparison of the actual ability of ships in actual seas.

Figure 6:
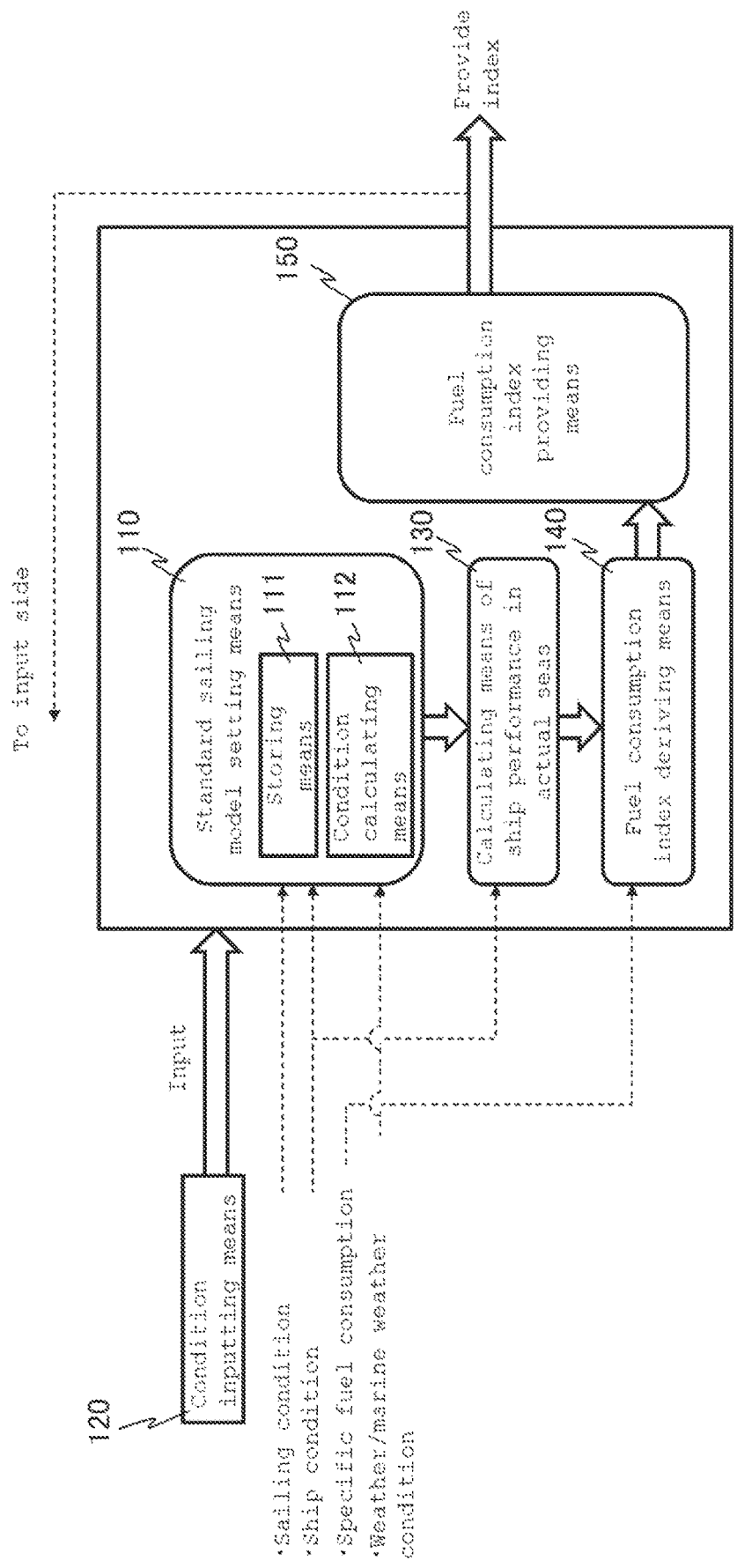
FIG. 6 is a block diagram showing an example of a ship propulsive performance in actual seas providing system as another embodiment of the invention.

FIG. 6 is a block diagram showing an example of a providing system of ship propulsive performance in actual seas as this embodiment.

The providing system of ship propulsive performance in actual seas of the embodiment includes standard sailing model setting means 110, condition inputting means 120, calculating means 130 of ship performance in actual seas, fuel consumption index deriving means 140, and fuel consumption index providing means 150. The providing system of ship propulsive performance in actual seas of the embodiment is mainly composed a computer and its peripheral device.

The standard sailing model setting means 110 has a function for setting the standard sailing model 2. The standard sailing model setting means 110 includes storing means 111 and condition calculating means 112. Various information which is necessary for setting the standard sailing model 2 such as a ship routes and standard weather/marine weather condition are stored in the storing means 111. The condition calculating means 112 calculates a standard biological fouling rate and standard aging deterioration rate as will be described later.

The condition inputting means 120 is used for inputting a sailing condition and a ship condition of the ship used by the standard sailing model 2. The condition inputting means 120 can also be used for inputting an arbitrary specific fuel consumption 4, the weather/marine weather condition and the biological fouling rate carried out by the user as will be described later. The condition inputting means 120 is an input device such as a keyboard and a touch panel.

The calculating means 130 of ship performance in actual seas calculates, using the calculating method 1 of ship performance in actual seas, ship performance in actual seas of the ship in accordance with conditions of the standard sailing model 2 and the ship condition into which the sailing condition is input.

The fuel consumption index deriving means 140 derives an index concerning fuel consumption of the ship as the ship propulsive performance index 3 based on a calculation result of the calculating means 130 of ship performance in actual seas.

The fuel consumption index providing means 150 provides, to the user, the index concerning the fuel consumption of the ship derived by the fuel consumption index deriving means 140.

It is preferable that the fuel consumption index providing means 150 provides as the index concerning the fuel consumption, to the user, at least one of main engine fuel consumption, a greenhouse gas exhaust index, a maintenance cost, and transportation efficiency index. According to this, the user can obtain the main engine fuel consumption, the greenhouse gas exhaust index, the maintenance cost and the transportation efficiency index as indexes which shows ship propulsive performance in actual seas objectively. The greenhouse gas exhaust index may be EEDI (Energy Efficiency Design Index) which is related a value showing an amount of $CO_2$ exhaust when a cargo of 1 ton through 1 mile at the time of designing, or may be EEOI (Energy Efficiency Operational Indicator) which is a value showing an amount of $CO_2$ exhaust by the actual operating condition while using a fuel usage amount and a voyage distance. The transportation efficiency index may be AER (Annual Efficiency Ratio) which is a value showing energy efficiency calculated using an actual cargo transportation amount of one year. The main engine fuel consumption, the greenhouse gas exhaust index, the maintenance cost and the transportation efficiency index are characterized in that they are indexes in which the evaluation period is taken into consideration.

It is preferable that the fuel consumption index providing means 150 provides, to the user, the sailing condition and the ship condition which are input by the condition inputting means 120. By providing, to the user, the condition which is input by the condition inputting means 120, the user can easily cinsiderunder what condition, the index concerning the fuel consumption is derived.

Processing flow of the providing system of ship propulsive performance in actual seas according to the embodiment will be described based on FIGS. 4 and 5.

The system includes a computer in which a providing program of ship propulsive performance in actual seas is incorporated, and the processing is executed through the following steps.

It is also possible that the computer reads the providing program of ship propulsive performance in actual seas is as one of processing, and executes the processing through the following steps, and this computer integrates arbitrary step in the following procedure as an individual program executed by another computer and the former computer executes the processing.

First, the standard sailing model setting means 110 reads the standard sailing model 2 of the ship in actual seas and sets a model (standard sailing model setting step S1). The standard sailing model 2 is a standard sailing model which is used when performance ship propulsive performance in actual seas is evaluated.

After the standard sailing model setting step S1, the standard sailing model setting means 110 receives, from the user, input of the sailing condition and the ship condition which are used by the standard sailing model 2.

The user inputs the ship condition using the condition inputting means 120 (ship condition inputting step S2-1), and inputs the sailing condition using the condition inputting means 120 (sailing condition inputting step S2-2) as the condition inputting step S2.

The ship condition which is input in the ship condition inputting step S2-1 is an important matter concerning the ship such as principal dimensions or hull shape.

The sailing condition inputting step S2-2 includes the ship route selecting step S2-2-1 for selecting a ship route, the loading condition setting step S2-2-2 for setting the loading condition, and the evaluation period setting step S2-2-3 for setting the evaluation period. According to this, the ship route, the loading condition and the evaluation period are set in the standard sailing model 2. It is preferable that the sailing condition which is input by the user in the sailing condition inputting step S2-2 is conditions concerning the ship route, the loading condition and the evaluation period. According to this, it is possible to derive the index concerning fuel consumption which is tailored to the reality of the situation under a condition closer to the actual operating condition. It is possible to set one of or a combination of two of the ship route, the loading condition and the evaluation period. In this case, for a condition which is not set by the user, a fixed condition which is previously stored in the storing means 111 is automatically set.

In the condition inputting step 32, setting of the operation mode of the main engine and the governor are received from the user per the loading condition and the driving condition. The user sets the operation mode of the main engine and the governor related to the operating position of the main engine as the operation mode of the main engine for each of the outward voyage and the homeward voyage using the condition inputting means 120 (operation mode setting step S2-3). The operation mode of the main engine and the governor are constant of engine revolution, constant output of the main engine, constant ship speed, and fuel index limit for example. By setting the operation mode of the main engine and the governor of the operating position of the main engine related to the operation mode of the main engine in actual seas, it is possible to evaluate ship performance in actual seas under a condition closer to the actual operating condition. Data of the operation mode of the main engine and the governor which are set in the operation mode setting step S2-3 are sent to the fuel consumption index deriving means 140.

In the condition inputting step S2, input of the specific fuel consumption is received from the user. The user inputs arbitrary specific fuel consumption using the condition inputting means 120 (specific fuel consumption inputting step S2-4).

In the ship route selecting step S2-2-1, the user selects one or more ship routes from multiple ship routes which are stored in the storing means 111. Examples of the ship routes are a North Pacific route, an Australian route, and a European route, etc.

If a ship route is selected in the ship route selecting step S2-2-1, the standard sailing model setting means 110 receives, from the user, selection whether the standard weather/marine weather condition is used for setting a weather/marine weather condition and occurrence probability for the selected ship route (standard weather/marine weather condition selecting step S3). By setting the occurrence probability of the weather/marine weather, it is possible to evaluate the propulsive performance under a condition which is closer to the actual operating condition. As the occurrence probability of the weather/marine weather, frequency distribution is set from a statistical value in accordance with a ship route for example.

In the standard weather/marine weather condition selecting step S3, when it is selected to use the standard weather/marine weather condition which is set per a ship route in the standard weather/marine weather condition selecting step S3, the standard sailing model setting means 110 extracts long-term statistic data corresponding to a ship route selected in the ship route selecting step S2-2-1 from the long-term statistic data of the standard weather/marine weather condition stored in the storing means 111 (long-term statistic data extracting step S4).

Based on the long-term statistic data extracted in the long-term statistic data extracting step S4, the standard sailing model setting means 110 sets the state of the weather/marine weather and the occurrence probability of the weather/marine weather condition to a ship route selected in the ship route selecting step S2-2-1 (weather/marine weather and occurrence probability setting step S6). The user can arbitrarily set the occurrence probability.

On the other hand, if it is selected not to use the standard weather/marine weather in the standard weather/marine weather condition selecting step S3, the standard sailing model setting means 110 receives input of the weather/marine weather condition from the user. The user inputs an arbitrary weather/marine weather condition using the condition inputting means 120 (weather/marine weather condition inputting step S5). If the arbitrary weather/marine weather condition is input, the procedure is shifted to the weather/marine weather and occurrence probability setting step S6.

It is easier for the user to use the standard weather/marine weather, but when weather/marine weather which is tailored to a ship route as the sailing condition is not incorporated, or when a target ship has a sailing policy to navigate while avoiding a ship route in which weather/marine weather is anticipated to be worse, there is a case where usage of an arbitrary weather/marine weather condition is more tailored to reality of the situation. To sail while avoiding weather/marine weather which is anticipated to be worse includes changing a ship course, increasing the ship speed and passing before the weather/marine weather becomes worse, reducing the ship speed for preventing the weather/marine weather from becoming worse, and waiting.

Data concerning the weather/marine weather condition and the occurrence probability per a ship route which are set in the weather/marine weather and occurrence probability setting step S6 are sent to the calculating means 130 of ship performance in actual seas.

In the loading condition setting step S2-2-2, the user sets a loading condition such as a full loaded condition and a ballast condition for each of the outward voyage and the homeward voyage. It is also possible to set multiple loading conditions for the outward voyage and the homeward voyage such as changing the loading condition per a discharge port.

If the loading condition is set in the loading condition setting step S2-2-2, the standard sailing model setting means 110 receives setting of the driving condition per the loading condition from the user. If the loading condition is set, draft is determined, and an external force condition of the ship which is varied in accordance with the draft is set. The user inputs at least one of the main engine revolution, the main engine output, the main engine torque and speed using the condition inputting means 20 as a driving condition (driving condition setting step S7). The operation mode of the main engine is based on the driving condition which is set per the loading condition. Since the operation mode of the main engine which is attributable to the trim and the draft which differs depending upon the loading condition can be set as the driving condition, the operation mode of the main engine can be brought to a condition which is closer to the actual operating condition. Based on the assumption that the driving condition is changed in some cases in accordance with variation of a status halfway through voyage, it is possible to set multiple driving conditions with respect to one loading condition. According to this, it is possible to evaluate and compare propulsive performance under various driving conditions. It is also possible to even out the loading condition and change only the driving condition, and even out the driving condition and change only the loading condition.

Data of the driving condition per the loading condition which is set in the driving condition setting step S7 is sent to the calculating means 130 of ship performance in actual seas.

In the evaluation period setting step S2-2-3, the user sets a period during which ship propulsive performance in actual seas is evaluated. The evaluation period is a life cycle of the ship, and the evaluation period is set from several years to several decades, but the life cycle may be a period from actual service to docking, a period from docking to next docking, or a period during which multiple dockings are assumed, and it is possible to freely set the life cycle.

After the actual service, resistance of a ship is increased by generation of slims and marine organisms, and deterioration of a coating film, and an external force condition acting on a ship is varied. The driving condition and a fuel injection are changed by wear and loosening of various portions of the main engine, and wear and damage of an air supply and exhaust system, a fuel supply system, a power transmission system and a propeller. They can be recovered in some cases by docking and receiving maintenance, but cannot be recovered in some cases as aging deterioration. In the evaluation period setting step S2-2-3, a setting operation in which these are taken into consideration is carried out.

If the evaluation period is set in the evaluation period setting step S2-2-3, the standard sailing model setting means 110 receives, from the user, setting or a docking interval, and selection whether standard aging deterioration rate is used.

The user sets the docking interval (docking interval setting step S8), and selects whether the standard aging deterioration rate is used (standard aging deterioration rate selecting step S13) using the condition inputting means 120.

In the docking interval setting step S8, the user sets the interval during which the ship docks for maintenance.

If the docking interval is set in the docking interval setting step S8, the standard sailing model setting means 110 receives, from the user, selection whether a standard biological fouling rate is used for setting a biological fouling rate used when defacement such as ship caused by attachment of slims and marine organism such as Balanomorpha is estimated (standard biological fouling ratio selecting step S9).

In the standard biological fouling ratio selecting step S9, if usage of the standard biological fouling ratio is selected, the condition calculating means 112 calculates a standard biological fouling rate based on the evaluation period (standard biological fouling rate calculating step 10).

Based on the standard biological fouling rate which is derived by calculation, the standard sailing model setting means 110 sets the biological fouling rate for the respective ship's hull and propeller (biological fouling rate setting step S12). By setting the biological fouling rate as one of variations of the external force condition and the driving condition in the set evaluation period, aging deterioration of the ship's hull and the propeller caused by the biological fouling is incorporated into the condition, and it is possible to evaluate the propulsive performance under a condition which is closer to the actual operating condition. The biological fouling rate includes parameter values of all of aging deteriorations related to aging deterioration including biological fouling, and examples of such parameter values are biofouling on the ship's hull and the propeller, generation of rust and boss, increase of friction resistance of the ship's hull caused by deterioration of a coating film and reduction of propulsion efficiency of the propeller.

On the other hand, if it is selected not to use the standard biological fouling rate in the standard biological fouling ratio selecting step S9, the standard sailing model setting means 110 receives input of the biological fouling rate from the user. The user inputs arbitrary biological fouling rate using the condition inputting means 120 (biological fouling rate inputting step S11). If the arbitrary biological fouling rate is input, the procedure is shifted to the biological fouling rate setting step S12.

It is easier for the user to use the standard biological fouling rate, but degrees of fouling an a ship's hull and a propeller and restoration are varied depending upon a maintenance method and and existence or non-existence of marine organism biofouling preventing means. Therefore, if arbitrary biological fouling rate is used, it is possible to make evaluation tailored to reality of the situation in some cases. It is also possible for the user to correct a standard biological fouling rate which is obtained by calculation.

Data of the biological fouling rates of the ship's hull and the propeller which are set in the biological fouling rate setting step S12 is sent to the calculating means 130 of ship performance in actual seas.

If it is selected to use the standard aging deterioration rate in the standard aging deterioration rate selecting step S13, the condition calculating means 112 calculates the standard aging deterioration rate (standard aging deterioration rate calculating step S14).

Based on the standard aging deterioration rate which is derived by calculation, the standard sailing model setting means 110 sets aging deterioration rates for the respective ship, the propeller, the main engine and the governor (aging deterioration rate setting step S16). By setting the deterioration rates of the ship and the driving system as one of variations of the external force condition and the driving condition in a set evaluation period, the aging deterioration of the driving system is incorporated into the condition, and it is possible to make evaluation of the performance under a condition which is closer to the actual operating condition.

In a main engine which burns fuel, the governor corresponds to a mechanical governor or an electronic governor, and in a main engine which uses electricity, the governor corresponds to an inverter or voltage adjusting means. A deterioration rate of the driving system includes all of parameter values related to deterioration rates which differs depending upon evaluation periods such as wear and damage of the main engine, the power transmission system, the air supply and exhaust system, the fuel supply system, and the propeller.

On the other hand, if it is selected not to use the standard aging deterioration rate in the standard aging deterioration rate selecting step S13, the standard sailing model setting means 110 receives input of the aging deterioration rate from the user. The user inputs arbitrary aging deterioration rate using the condition inputting means 120 (aging deterioration rate inputting step S15). If the arbitrary aging deterioration rate is input, the procedure is shifted to the aging deterioration rate setting step S16.

It is easier for the user to use the standard aging deterioration rate, but since a degree of the aging deterioration is varied depending upon a maintenance method and performance of a device, if arbitrary aging deterioration rate is used, it is possible to make evaluation which is more tailored to reality of the situation in some cases. The user can also correct the standard aging deterioration rate which is obtained by calculation.

Among data of the aging deterioration rate which is set in the aging deterioration rate setting step S16, data of the aging deterioration rates of the ship, the propeller and the main engine is sent to the calculating means 130 of ship performance in actual seas, and the aging deterioration rate of the governor which exerts influence on the fuel injection is sent to the fuel consumption index deriving means 140.

The calculating means 130 of ship performance in actual seas calculates a ship response of each of the loading condition and the driving condition, the evaluation period and the weather/marine weather based on a state and occurrence probability of the weather/marine weather of the ship route, a driving condition per the loading condition, the biological fouling rate of the ship's hull and the propeller, and data of the aging deterioration rates of the ship, the propeller and the main engine (ship response calculating step S17).

In the calculation of the ship response, a relation between the main engine output, the main engine revolution and speed through the water in actual seas per evaluation period from external force such as still water resistance, self-propulsion factors in still water, open water characteristics of the propeller, wind forces, steady force in waves, self-propulsion factors in waves, drift forces, rudder forces, the biological fouling rate, and aging deterioration rate.

In the calculation executed by the calculating means 130 of ship performance in actual seas, a specific fuel consumption of the main engine and actuation characteristics of the main engine are not put into consideration. Therefore, it is possible to calculate the ship response from, which influence of the specific fuel consumption of the main engine and the operation mode of the main engine are removed.

The fuel consumption index deriving means 140 receives, from the user, selection whether the amount of standard fuel consumption should be used for setting the specific fuel consumption 4 (standard specific fuel consumption selecting step S18).

If it is selected to use the standard specific fuel consumption in the standard specific fuel consumption selecting step S18, the fuel consumption index deriving means 140 calculates the standard specific fuel consumption (standard specific fuel consumption calculating step S19). The condition calculating means 112 may calculate the standard specific fuel consumption.

A specific fuel consumption (SFC) 4 is set based on the standard specific fuel consumption which is derived by calculation (specific fuel consumption setting step S20).

On the other hand, it is selected not to use the standard specific fuel consumption in the standard specific fuel consumption selecting step S18, arbitrary specific fuel consumption which is input in the specific fuel consumption inputting step S2-4 is read. According to this, it is possible to make evaluation also by arbitrary specific fuel consumption which is different from the standard specific fuel consumption. If the arbitrary specific fuel consumption is read, the procedure is shifted to the specific fuel consumption setting step S20.

It is easier for the user to use the standard specific fuel consumption, but if the arbitrary specific fuel consumption is used, it is possible to make evaluation which is more tailored to reality of the situation in some cases. The user can also correct a specific fuel consumption which is obtained by calculation. It is also possible to set multiple specific fuel consumption 4. For example, it is also possible to the specific fuel consumption 4 according to kinds of fuel such as Marine Diesel oil, Marine Fuel oil and gas fuel, and set multiple specific fuel consumption 4 while taking a difference of property into consideration even if the king of fuel is the same.

The Marine Fuel oil which is mainly used in ships has variation in property depending upon production area and a difference of density of about 20% is generated. Therefore, there is a problem that conditions for evaluating the ship propulsive performance in actual seas of the ship are unequal. However, for deriving an index concerning the fuel consumption of a ship as in this embodiment, the standard specific fuel consumption or the arbitrary specific fuel consumption is used, and the specific fuel consumption 4 is input. According to this, since it is possible to evaluate under the same condition, a difference caused by fuel quality does not affect the evaluation, and it is possible to evaluate only by ship propulsive performance. It is also possible to calculate ship performance in actual seas of an individual ship while taking a specific fuel consumption of the main engine and operation mode of the main engine into consideration.

The fuel consumption index deriving means 140 calculates the main engine number of revolution, the main engine output, the main engine torque, speed, a fuel consumption, a drift angle and a rudder angle as a loading condition, a driving condition, evaluation period and weather/marine weather based on the set specific fuel consumption 4 and the aging deterioration rate of the governor and the like, and the fuel consumption index deriving means 140 derives an index concerning the fuel consumption of the ship as the ship propulsive performance index 3 (fuel consumption index deriving step S21).

The index concerning the fuel consumption can be derived as the life cycle main engine fuel consumption 5 which shows fuel consumption of the main engine which is calculated from a total fuel consumption of the main engine, a total transportation distance and a total load capacity for a long period of the ship which is set as the evaluation period. By deriving the index concerning the fuel consumption as the life cycle main engine fuel consumption 5, it is possible to appropriately evaluate ship propulsive performance in actual seas when the ship is operated for a long period from several years to several decades before the operation of the ship is started for example. The index concerning the fuel consumption includes, in addition to the life cycle main engine fuel consumption 5, fuel economy of the main engine calculated from the total fuel consumption of the main engine, the total transportation distance and the total load capacity for the evaluation period, and any unit can be selected as a unit of the fuel consumption index. A life cycle may be a period from actual service to docking, a period from docking to next docking, or a period during which multiple dockings are assumed.

The fuel consumption index providing means 150 provides the index concerning the fuel consumption derived in the fuel consumption index deriving step S21 (index providing step S22).

As described above, this system includes the standard sailing model setting means 110 which sets a standard sailing model 2 of a ship in actual seas, the condition inputting means 120 which inputs a sailing condition used for the standard sailing model 2 and a condition of a ship of the ship, the calculating means 130 of ship performance in actual seas which calculates ship propulsive performance in actual seas in accordance with the standard sailing model 2 into the sailing condition is input and the ship condition, the fuel consumption index deriving means 140 which derives an index concerning fuel consumption of the ship based on a calculation result of the calculating means 130 of ship performance in actual seas, and the fuel consumption index providing means 150 which provides a derivation result of the index concerning the fuel consumption. According to this, also concerning a ship before it sails for example, it is possible to precisely derive an index concerning fuel consumption of the ship in actual seas based on the sailing condition and the ship condition, and provide the index to the user.

An evaluation result of the ship propulsive performance in actual seas can be utilized also during sailing or after sailing in addition to utilization before sailing. During sailing, the evaluation result can be utilized for selecting a ship route or for determining the change of fuel for example. After the sailing, the evaluation result can be utilized for evaluation of voyage by comparing an index concerning fuel consumption derived before sailing and an index calculated from a fuel amount which is actually consumed or for evaluation of the calculating method 1 of ship performance in actual seas. The evaluation result need not be utilized for actual sailing, and the evaluation result can be utilized only for evaluation of the ship propulsive performance in actual seas.

Figure 7:
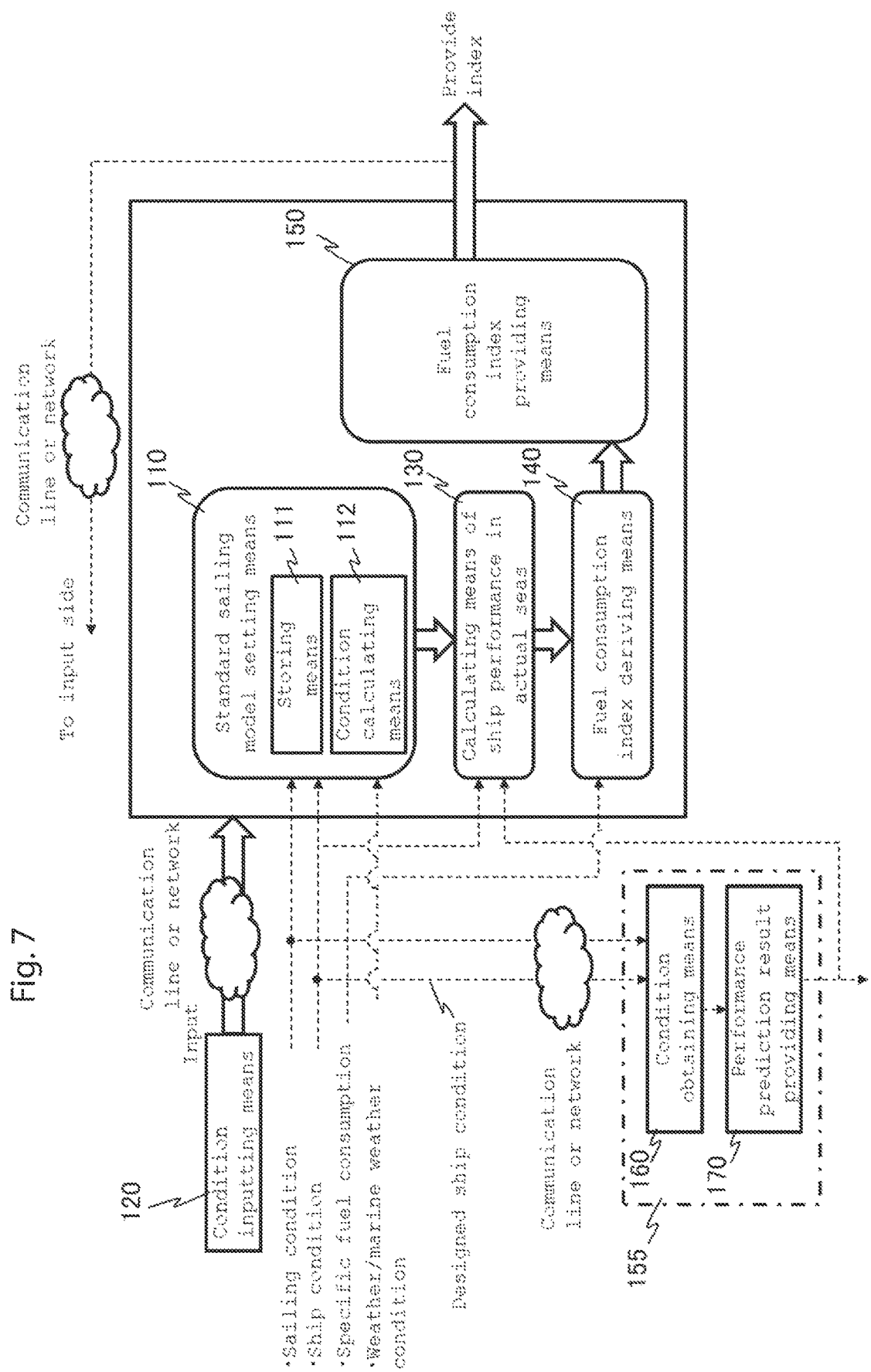
FIG. 7 is a block diagram showing another example of the ship propulsive performance in actual seas providing system.

FIG. 7 is a block diagram showing another example of the providing system of ship propulsive performance in actual seas according to the embodiment. The same symbols are allocated to members having the same functions as those in the above described examples, and description thereof will be omitted.

The providing system of ship propulsive performance in actual seas according to this example includes the standard sailing model setting means 110, the condition inputting means 120, the calculating means 130 of ship performance in actual seas, the fuel consumption index deriving means 140, the fuel consumption index providing means 150, condition obtaining means 160, and performance prediction result providing means 170. The providing system of ship propulsive performance in actual seas in the example is mainly composed of a computer, a peripheral device thereof, and a communication line or a network.

The condition inputting means 120, the standard sailing model setting means 110, the calculating means 130 of ship performance in actual seas and the fuel consumption index deriving means 140 are connected to each other through a specific communication line, and the user inputs the sailing condition and the ship condition through the communication line or the network. The fuel consumption index providing means 150 is connected to a terminal used by the user through the communication line or the network, and a derivation result of an index concerning fuel consumption is provided to the user through the communication line or the network. According to this, even if the user exists in a distant place, input of a condition from the user can be received through the communication line or the network, and provide, to the user, the index concerning fuel consumption of the ship in actual seas which is derived based on the input condition. Further, even when a plurality of users who consider to use the same ship exist at a distant location, it is possible to share the condition input and to commonly have derivation results of the index concerning fuel consumption through the communication line or the network. It is possible to concurrently use the communication line and the network. The meaning that the fuel consumption index providing means 150 provides the fuel index includes a case where the user goes to check a derivation result stored in the storing means or the like of the fuel consumption index providing means 150. The user may be a ship itself which is in actual service.

The standard sailing model setting means 110 can receive, from the user, the input of a planned ship condition which is not in actual service as a ship condition. In this case, the fuel consumption index providing means 150 provides, to the user, a derivation result of the index concerning fuel consumption of the ship which is not in actual service.

As described above, this system can receive the input of the planned ship condition from the user, and can provide, to the user, the index concerning fuel consumption of the ship which is not in actual service in actual seas which is derived based on the input planned ship condition. The user can review the ship condition of the ship which is not in actual service based on the provided index. The ship which is not in actual service is a ship before it is completed in which its scheme or design is considered or the ship as being constructed. The planned ship condition is a ship condition in which the ship which is not in actual service is scheduled.

When the standard sailing model setting means 110 receives, from the user, input of the planned ship conditions of ships which are not in actual service, the fuel consumption index providing means 150 makes it possible to compare derivation results of indexes concerning fuel consumption of the ships which are not in actual service, and provides the derivation results to the user.

As described above, this system receives inputs of planned ship conditions from the user, and can provide, to the user, indexes concerning fuel consumption of the ships which are not in actual service in actual seas which are respectively derived corresponding to the input planned ship conditions in a comparable manner. According to this, the user can easily compare ship propulsive performance in actual seas which are not in actual service.

When input of a planned ship condition is received, a sailing condition and a planned ship condition which are input by the user using the condition inputting means 120 are also sent to the condition obtaining means 160 provided in performance predicting means 155. The performance prediction result providing means 170 provides, to the user, a performance prediction result of a ship which is in accordance with the sailing condition and the planned ship condition obtained by the condition obtaining means 160, and sends the performance prediction result to the calculating means 130 of ship performance in actual seas. The performance predicting means 155 has the condition obtaining means 160 and the performance prediction result providing means 170. The performance predicting means 155 may have functions only to obtain a condition and provide a performance prediction result, or may also have a function to actually predict performance.

Here, the performance prediction result of a ship is a result in which performance of a ship is predicted from a view point which is different from an index concerning fuel consumption derived by the fuel consumption index deriving means 140 using the calculating method 1 of ship performance in actual seas and the standard sailing model 2, and the performance prediction result is derived by calculation carried out by computational fluid dynamics (CFD) which is numerical analysis/simulation technique, or a tank test which simulates real sea condition.

As described above, this system can provide, to the user, a performance prediction result obtained by the tank test, numerical analysis/simulation technique executed by the performance predicting means 155 together with the index concerning fuel consumption in actual seas for the ship which is not in actual service. According to this, the user can evaluate the ship propulsive performance in actual seas of the ship which is not in actual service in more multifaceted manner. It is also possible to use a performance prediction result for the calculating means 130 of ship performance in actual seas to enhance the calculation precision of the calculating means 130 of ship performance in actual seas.

The CFD and the tank test which are executed by the performance predicting means 155 can be carried out as a business as a CFD calculation institution or a tank test institution. When the performance prediction result of a ship is derived by the CFD and the tank test, it is preferable that a derivation result of an index concerning fuel consumption is provided from the fuel consumption index providing means 150 also to the CFD calculation institution which carries out the CFD or the tank test institution having a ship model basin. According to this, the CFD calculation institution and the water tank test institution can utilize the derivation result of the index concerning fuel consumption to enhance the precision of prediction of performance of a ship.

Figure 8:
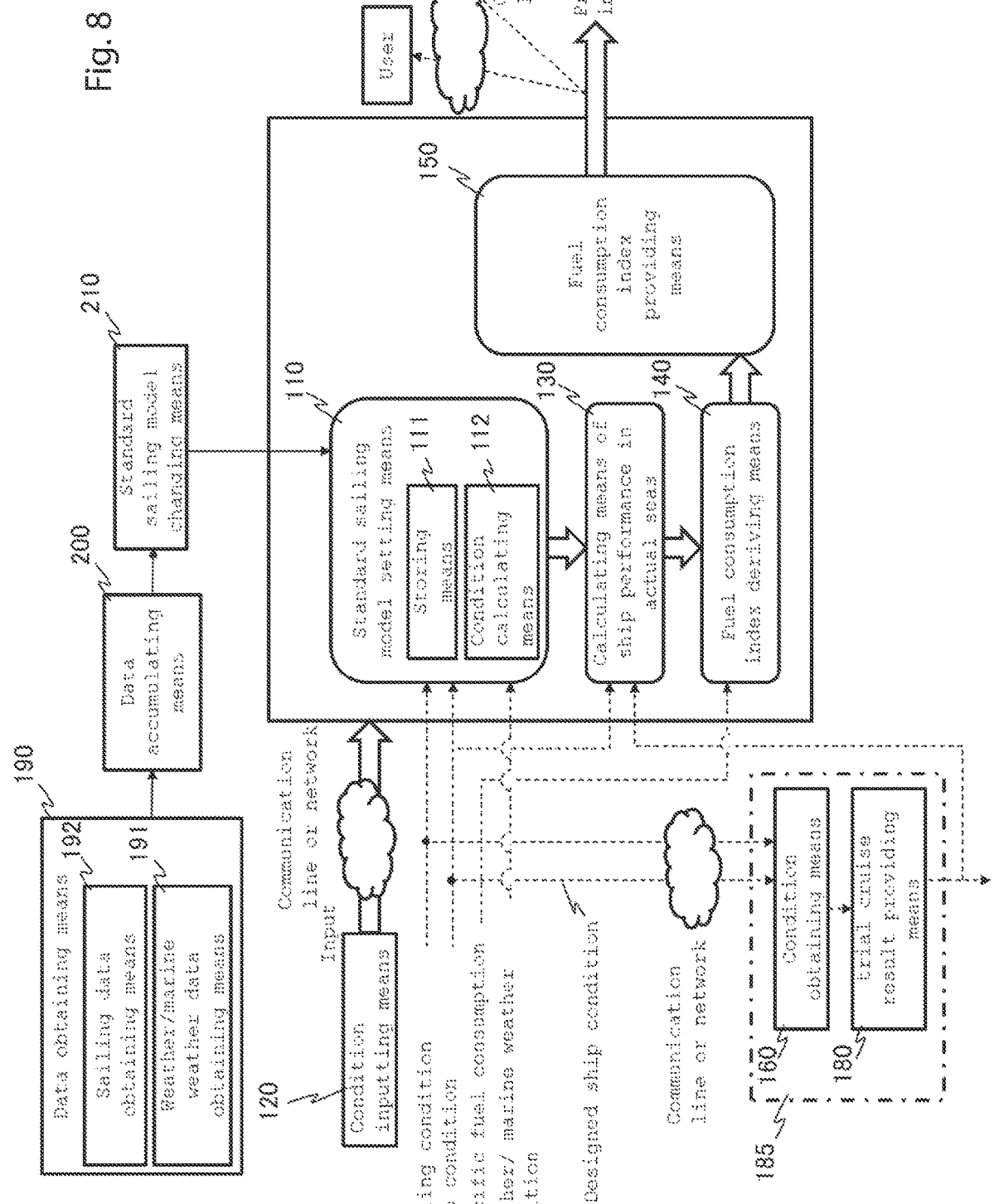
FIG. 8 is a block diagram showing another example of the ship propulsive performance in actual seas providing system.

FIG. 8 is a block diagram showing another example of the providing system of ship propulsive performance in actual seas according to the embodiment. The same symbols are allocated to members having the same functions as those in the above described examples, and description thereof will be omitted.

The providing system of ship propulsive performance in actual seas according to this example includes the standard sailing model setting means 110, the condition inputting means 120, the calculating means 130 of ship performance in actual seas, the fuel consumption index deriving means 140, the fuel consumption index providing means 150, the condition obtaining means 160, sea trial result providing means 180, weather/marine weather data obtaining means 191 and sailing data obtaining means 192 as data obtaining means 190, data accumulating means 200, and standard sailing model changing means 210. The providing system of ship propulsive performance in actual seas in this example is mainly composed of a computer as a server, its peripheral device, a communication line or a network.

The standard sailing model setting means 110, the calculating means 130 of ship performance in actual seas and the fuel consumption index deriving means 140 are possessed, as a server, by a provider of ship propulsive performance in actual seas which is a business operator of the ship propulsive performance in actual seas. The condition inputting means 120 and the server are connected to each other through the communication line or the network. If a sailing condition and a ship condition are input from the user, the server derives an index concerning fuel consumption in accordance with a standard sailing model to which a sailing condition is input and a ship condition.

The fuel consumption index providing means 150 is connected to a terminal used by a user or a third party other than the user through the communication line or the network, and provides, to the user or the third party, a derivation result of an index concerning fuel consumption through the communication line or the network. Information of the derivation result of the index concerning fuel consumption can be provided to the third party if agreement of the user or the other party of the user is gained.

If the provider of ship propulsive performance in actual seas has the standard sailing model setting means 110 and the calculating means 130 of ship performance in actual seas as the server as in this example, the user can obtain the derivation result of the index concerning fuel consumption from the outside server. Therefore, it is possible to reduce introduction cost and management cost of a device. Since the provider of ship propulsive performance in actual seas derives the index concerning fuel consumption in an integrated fashion, it becomes easy to constantly keep the derivation precision of the index irrespective of the user.

The fuel consumption index providing means 150 provides the index concerning fuel consumption of a target ship in actual seas also to a third party in addition to the user. Therefore, the third party also can know and evaluate the ship propulsive performance in actual seas of the ship based on the index received through the communication line or the network. The third party is a certification institution or a public institution which certifies an index concerning fuel consumption for the user, or a business operator of a chartered ship which charters a ship from a ship owner and carries out transportation. When the user is a business operator who designs a ship, there can be many cases such as a case where a ship owner as an ordering party other than a ship building company as the other party of the user becomes the third party.

The designing business operator who designs a ship can receive a request from the shipbuilding company or the ship owner, can subjectively utilize this system, can commonly have information together with the business operator itself or a client, and can design a ship having an excellent index concerning fuel consumption. When the designing business operator receives a request from the shipbuilding company or the ship owner to design a portion of a ship, a sailing condition and a ship's hull condition which are not related to the portion are made the same, an index concerning fuel consumption when the portion is changed is obtained and it is possible to optimize the design of the portion of the ship.

The fuel consumption index providing means 150 provides a calculation result of the calculating means 130 of ship performance in actual seas to the user or the third party. By providing the calculation result of the calculating means 130 of ship performance in actual seas based on which the index is derived together with the index concerning fuel consumption, it becomes easy for the user to study a sailing configuration of a ship and review a maintenance period, make an estimation of the ship, and check an actual power curves. A calculation result of the ship propulsive performance calculating in actual seas means 130 can be provided by separately providing means to provide the calculation result without through the fuel consumption index providing means 150.

It is preferable that the fuel consumption index providing means 150 provides, also to the third party, the sailing condition and the ship condition which are input by the condition inputting means 120. By providing the conditions which are input by the condition inputting means 120 also to the third party, the third party can easily consider based under what condition the index concerning fuel consumption is derived.

The standard sailing model setting means 115 can receive, from the user, the input of a designed ship condition of an actual service ship as the ship condition. In this case, the fuel consumption index providing means 150 provides a derivation result of the index concerning fuel consumption of the actual service ship to the user.

As described above, this system can receive the input of the designed ship condition from the user, and provide, to the user, the index concerning fuel consumption of the actual service ship in actual seas which is derived based on the input designed ship condition. The user can select a ship route, and consider the maintenance period based on the provided index. The actual service ship is a ship whose construction is completed, and also includes a ship which is on the way to inspection before the actual service. The designed ship condition is a ship condition whose design concerning the actual service ship is completed. The actual service ship may be a ship itself as the user, and the system can be utilized when a ship is chartered, when purchase of a used ship is considered, and when a ship which is suitable for a ship route is considered.

When the standard sailing model setting means 110 receives inputs of designed ship conditions of multiple actual service ships from the user, the fuel consumption index providing means 150 makes it possible to compare derivation results of indexes concerning fuel consumption of the multiple actual service ships, and provides the same to the user.

As described above, this system can receive the inputs of the multiple designed ship conditions from the user, and can provide, to the user, the indexes concerning fuel consumption of actual service ships in actual seas respectively derived corresponding to the input multiple designed ship conditions. According to this, the user can easily compare the ship propulsive performance in actual seas of the actual service ships.

When input of the designed ship condition is received, the sailing condition and the designed ship condition which are input by the user using the condition inputting means 120 are sent also to the condition obtaining means 160. The sea trial result providing means 180 provides, to the user, a sea trial result of a ship tailored to the sailing condition and the designed ship condition obtained by the condition obtaining means 160, and sends the sea trial result to the calculating means 130 of ship performance in actual seas. In this case, sea trial means 185 is provided with the condition obtaining means 160 and the sea trial result providing means 180.

As described above, this system can provide, to the user, the sea trial result obtained by the sea trial means 185 together with the index concerning fuel consumption in actual seas for the actual service ship. According to this, the user can evaluate the ship propulsive performance in actual seas of the actual service ship in more multifaceted manner. It is also possible to use the sea trial result in the calculating means 130 of ship performance in actual seas to enhance the calculation precision of the calculating means 130 of ship performance in actual seas. The sea trial means 185 may have only functions for obtaining a condition and providing a sea trial result, or may also have a function for obtaining data caused by actual sea trial.

When a sea trial institution other than the user or a third party carries out sea trial of a ship at sea or shop test of an engine or shop test of a device as a business, it is preferable that a derivation result of the index concerning fuel consumption is provided from the fuel consumption index providing means 150 also to the sea trial institution which is the sea trial means 185. According to this, the sea trial institution can utilize the derivation result of the index concerning fuel consumption for enhancing the sea trial method.

The weather/marine weather data obtaining means 191 and the sailing data obtaining means 192 are provided in a sailing ship for example. The weather/marine weather data obtaining means 191 obtains weather/marine weather data in actual seas. The sailing data obtaining means 192 obtains sailing data of a ship in actual seas. The sailing data is the main engine revolution, main engine torque and speed for example. The obtained weather/marine weather data in the real sea area and the sailing data can be utilized for enhancing precision of the calculating method 1 of ship performance in actual seas. The data obtaining means 190 may be limited to acquisition of the sailing data and acquisition of weather/marine weather data, or may also have a sensor function for actually obtaining data.

The weather/marine weather data obtained by the weather/marine weather data obtaining means 191 and the sailing data obtained by the sailing data obtaining means 192 are accumulated in the data accumulating means 200. The data accumulating means 200 is a storing device such as a hard disk for example.

The weather/marine weather data and the sailing data may be data obtained by a specific ship or data obtained by an unspecified ship, but it is preferable that the weather/marine weather data and the sailing data are obtained as a set. It is also possible that the weather/marine weather data obtained by the weather/marine weather data obtaining means 191 and the sailing data obtained by the sailing data obtaining means 192 are input as a sailing condition and a weather/marine weather condition by the condition inputting means 120 per a ship route. A ship operation company which sails a ship accumulates data, and the data can be put into service when the weather/marine weather condition corresponding to a ship route is input.

The standard sailing model changing means 210 changes the standard sailing model 2 based on the weather/marine weather data and the sailing data accumulated in the data accumulating means 200. The contents of the changed standard sailing model 2 is stored in the storing means 111. The standard sailing model 2 is improved based on the accumulated weather/marine weather data and the sailing data, and it is possible to derive an index concerning fuel consumption more precisely and provide the index. When the standard sailing model 2 is changed, a provider of ship propulsive performance in actual seas temporarily stops the provision of service of this system. The provider of ship propulsive performance in actual seas previously informs the user of stop of the system and then, the provider stops the provision. The provider of ship propulsive performance in actual seas previously verifies the change of the standard sailing model 2 and then, changes the standard sailing model 2. The standard sailing model 2 is changed based on determination of the provider of ship propulsive performance in actual seas, but the fact that the standard sailing model 2 is changed is informed also to the user and the like when the standard sailing model 2 is changed or when next ship propulsive performance in actual seas is provided, and version information is always provided to the user together with provision of an index concerning fuel consumption.

Figure 9:
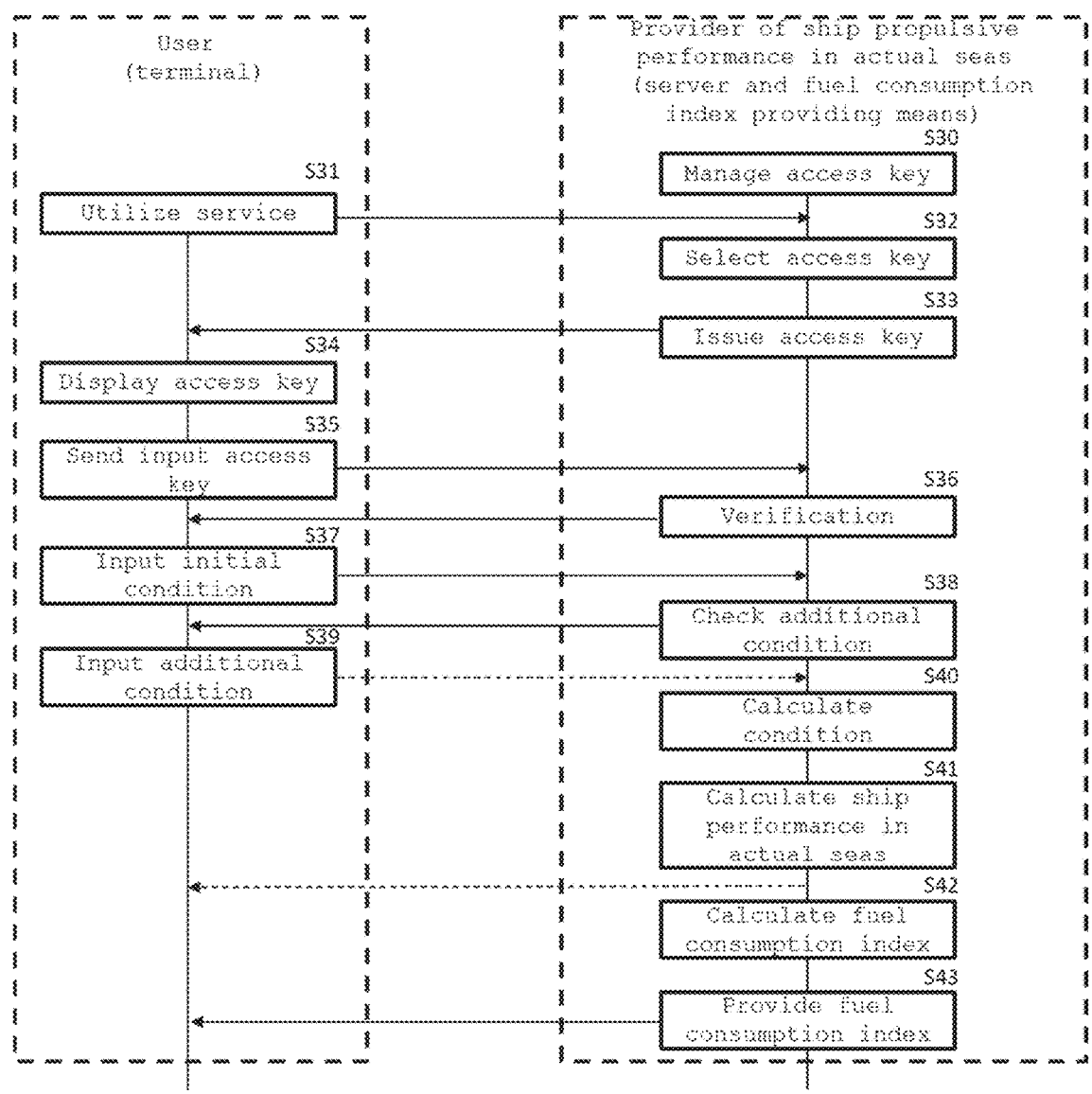
FIG. 9 is a usage flow chart of the ship propulsive performance in actual seas providing system shown in FIG. 8.

FIG. 9 is a usage flow chart of an example of the providing system of ship propulsive performance in actual seas shown in FIG. 8.

In FIG. 9, a left side shows the user, and a right side shows the provider of ship propulsive performance in actual seas. A terminal used by the user, a server possessed by the provider of ship propulsive performance in actual seas (standard sailing model setting means 110, the calculating means 130 of ship performance in actual seas and fuel consumption index deriving means 140), and the fuel consumption index providing means 150 are connected to each other through the communication line or the network.

The server previously produces an access key and manages the same (access key managing step S30).

The user requests to utilize the service of the system from the terminal (service requesting step S31). If the server receives the request to utilize the service, the access key is selected (access key selecting step S32), and the access key is issued for the user (access key issuing step S33). The issued access key is displayed on the terminal of the user (access key displaying step S34), When the user utilizes this system, the obtained access key sends to the server (access key sending step S35). The server certificates the user based on the received access key (certificating step S36). If the certification is completed, the user can utilize the system.

After the certificating step S36, the user inputs the sailing condition and the ship condition used in the standard sailing model 2 using the condition inputting means 120 (initial condition inputting step S37). The server receive the selection of a ship route and the setting of the loading condition, and checks the user whether standard weather/marine weather condition, a standard biological fouling rate, and a standard aging deterioration rate are used (additional condition checking step S38). When the user selects not to use the standard weather/marine weather condition, the standard biological fouling rate, and the standard aging deterioration rate, the user inputs arbitrary weather/marine weather condition, a biological fouling rate and a aging deterioration rate using inputting means 120 (additional condition inputting step S39).

In the server, when the user selects to use the standard biological fouling rate and the standard aging deterioration rate, the standard sailing model setting means 110 calculates the standard biological fouling rate and the standard aging deterioration rate using the condition calculating means 112 (condition calculating step S40). The calculating means 130 of ship performance in actual seas calculates the ship propulsive performance in actual seas in accordance with the standard sailing model 2 into which the sailing condition is input and the ship condition (calculating step S41 of ship propulsive performance in actual seas). A calculation result of the calculating means 130 of ship performance in actual seas is sent to the user and the fuel consumption index deriving means 140. The fuel consumption index deriving means 140 calculates an index concerning fuel consumption of the ship based on the received calculation result (fuel consumption index calculating step S42).

The index concerning fuel consumption of the ship derived by the fuel consumption index deriving means 140 is provided from the fuel consumption index providing means 150 to the user (fuel consumption index providing step 343).

Various kinds of certification methods can be applied as a certification method, but it is preferable that triple certification (IEEE802.1X certification, Web certification, MAC certification) from the viewpoint of realizing strong security environment and reducing risk of unauthorized access. In the case of an actual service ship, a ship's name or an identification number of a ship can also be used for certification of the user, and it is also possible to use a ship condition which is associated with the ship's name and the identification number of the ship as a ship condition.

The preferable embodiments of the present invention have been described above, the invention is not limited to the embodiments, the invention can variously be modified and carried out within a range of the patent claims, the detailed description of the invention and the accompanying drawings, and needless to say, such modifications belong to the scope of the invention.

Lastly, the following additional statements are further disclosed concerning the above description.

A technical field of the present invention can be a providing system of ship propulsive performance in actual seas. An object of the invention is to provide a providing system of ship propulsive performance in actual seas capable of precisely evaluating ship propulsive performance in actual seas on the same scale also before the ship sails for example.

Additional Statement 1

A providing system of ship propulsive performance in actual seas comprising standard sailing model setting means for setting a standard sailing model of the ship in actual seas, condition inputting means for inputting a sailing condition used for the standard sailing, model and a ship condition of the ship, calculating means of ship performance in actual seas for calculating ship performance in actual seas in accordance with the standard sailing model into which the sailing condition is input and the ship condition, fuel consumption index deriving means for deriving an index concerning fuel consumption of the ship based on a calculation result of calculating means of ship performance in actual seas, and fuel consumption index providing means for providing a derivation result of the index concerning the fuel consumption.

According to the above configuration, also concerning a ship before it sails for example, it is possible to precisely derive the index concerning the fuel consumption of the ship in actual seas based on the sailing condition and the ship condition, and provide the index.

Additional Statement 2

The providing system of ship propulsive performance in actual seas described in the additional statement 1, wherein a weather/marine weather condition is input as the sailing condition by the condition inputting means, and the calculating means of ship performance in actual seas calculates ship propulsive performance in actual seas using the standard sailing model into which the weather/marine weather condition is input.

According to the above configuration, when the weather/marine weather which is tailored to a ship route as a sailing condition is not incorporated for example, or when a ship having a sailing policy to navigate while avoiding weather/marine weather which is anticipated to become worse is a target, it is possible to evaluate in a manner more tailored to reality of the situation by inputting arbitrary weather/marine weather condition.

Additional Statement 3

The providing system of ship propulsive performance in actual seas described in the additional statement 1 or 2, wherein the condition inputting means allows a user to input the sailing condition and the ship condition through at least one of a communication line and a network, and the fuel consumption index providing means provides, to the user, a derivation result of the index concerning the fuel consumption through at least one of the communication line and the network.

According to the above configuration, even if the user exists in a distant place, input of a condition from the user can be received through the communication line or the network, and provide, to the user, the index concerning the fuel consumption of the ship in actual seas which is derived based on the input condition.

Additional Statement 4

The providing system of ship propulsive performance in actual seas described in the additional statement 3, wherein a plan of ship condition of a ship which is not in actual service is input as the ship condition, and a derivation result of the index concerning the fuel consumption of the ship which is not in actual service is provided.

According to the above configuration, input of the planned ship condition is received from the user, and can provide, to the user, the index concerning the fuel consumption of the ship which is not in actual service in actual seas which is derived based on the input planned ship condition. The ship which is not in actual service is a ship before it is completed in which its scheme or design is considered or the ship is being constructed. The planned ship condition is a ship condition in which a ship which is not in actual service is scheduled.

Additional Statement 5

The providing system of ship propulsive performance in actual seas described in the additional statement 4, wherein plan of ship conditions of ships which are not in actual service are input, it makes it possible to compare derivation results of indexes concerning the fuel consumptions of the ships which are not in actual service and provide the same.

According to this configuration, input of planned ship conditions is received from the user, and can provide, to the user, indexes concerning fuel consumption of ships which are not in actual service in actual seas which are respectively derived corresponding to the input planned ship conditions in a comparable manner.

Additional Statement 6

The providing system of ship propulsive performance in actual seas described in the additional statement 4 or 5, further including condition obtaining means for obtaining the plan of ship condition which is input as the sailing condition and the ship condition, and performance prediction result providing means for providing a performance prediction result of the ship which is tailored to the sailing condition and the plan of ship condition.

According to the above configuration, it is possible to provide, to the user, a performance prediction result obtained by a tank test, a numerical analysis/simulation technique for example together with the index concerning the fuel consumption in actual seas concerning the ship which is not in actual service. It is also possible to use the performance prediction result for the calculating means of ship performance in actual seas to enhance the calculation precision of the calculating means of ship performance in actual seas.

Additional Statement 7

The providing system of ship propulsive performance in actual seas described in the additional statement 3, wherein a designed ship condition of an actual service ship is input as the ship condition, and a derivation result of an index concerning the fuel consumption of the actual service ship is provided.

According to this configuration, the input of the designed ship condition is received from the user, and provide, to the user, the index concerning the fuel consumption of the actual service of the ship in actual seas which is derived based on the input designed ship condition. The actual service of the ship is a ship whose construction is completed, and also includes a ship which is on the way to inspected before actual service. The designed ship condition is a ship condition whose design concerning the actual service ship is completed.

Additional Statement 8

The providing system of ship propulsive performance in actual seas described in the additional statement 7, wherein the designed ship conditions of the actual service ships, and derivation results of indexes concerning the fuel consumptions of the actual service ships are provided in a comparable manner.

According to this configuration, inputs of designed ship conditions are received from the user, and can provide, to the user, indexes concerning fuel consumptions of actual service ships in actual seas respectively derived corresponding to the input designed ship conditions.

Additional Statement 9

The providing system of ship propulsive performance in actual seas described in the additional statement 7 or 8, including condition obtaining means for obtaining the designed ship condition which is input as the sailing condition and the ship condition, and sea trial result providing means for providing a sea trial result of the ship which is tailored to the sailing condition and the designed ship condition.

According to this configuration, it is possible to provide the sea trial result to the user together with an index concerning the fuel consumption in actual seas for the actual service ship. It is also possible to use the sea trial result in the calculating means of ship performance in actual seas to enhance the calculation precision of the calculating means of the ship performance in actual seas.

Additional Statement 10

The providing system of ship propulsive performance in actual seas described in the additional statement 3, wherein the fuel consumption index providing means provides, to a third party other than the user, a derivation result of an index concerning the fuel consumption through at least one of the communication line and the network.

According to this configuration, the index concerning the fuel consumption of a ship in actual seas is provided not only to the user but also to the third party, and the third party also can know and evaluate ship propulsive performance in actual seas of a ship based on the index received through the communication line or the network.

Additional Statement 11

The providing system of ship propulsive performance in actual seas described in any one of the additional statements 3 to 10, wherein a provider of ship propulsive performance in actual seas possesses the standard sailing model setting means and the calculating means of ship performance in actual seas as a server, and a derivation result of an index concerning the fuel consumption utilizing the server is provided.

According to this configuration, since the user can obtain a derivation result of an index concerning the fuel consumption from the outside server, it is possible to reduce an introduction cost and a management cost of a device. The provider of ship propulsive performance in actual seas can also possess fuel consumption index deriving means as a server and provide the derivation result of the index concerning the fuel consumption.

Additional Statement 12

The providing system of ship propulsive performance in actual seas described in any one of the additional statements 1 to 11, wherein multiple sailing conditions which are input by the condition inputting means is a ship route, a loading condition, and an evaluation period.

According to this configuration, it is possible to derive and provide an index concerning the fuel consumption which is tailored to reality of a ship under a condition closer to actual operating condition.

Additional Statement 13

The providing system of ship propulsive performance in actual seas described in any one of the additional statements 1 to 12, further including at least one of weather/marine weather data obtaining means for obtaining weather/marine weather data in actual seas and sailing data obtaining means for obtaining sailing data of the ship in actual seas, wherein the providing system of ship propulsive performance in actual seas further includes data accumulating means for accumulating at least one of the obtained weather/marine weather data and the sailing data, and standard sailing model changing means for changing the standard sailing model based on at least one of the accumulated weather/marine weather data and the sailing data.

According to this configuration, by obtaining the weather/marine weather data and the sailing data in actual seas, it is possible to utilize the calculating method of ship performance in actual seas to enhance the precision. Further, it is possible to improve the standard sailing model based on the accumulated weather/marine weather data and sailing data to more precisely derive and provide the index concerning the fuel consumption.

Additional Statement 14

The providing system of ship propulsive performance in actual seas described in any one of the additional statements 1 to 13, wherein the fuel consumption index providing means provides at least one of main engine fuel consumption, a greenhouse gas exhaust index, a maintenance cost, a transportation efficiency index as an index concerning the fuel consumption.

According to this configuration, it is possible to provide the main engine fuel consumption, the greenhouse gas exhaust index, the maintenance cost and the transportation efficiency index as an index which objectively indicates performance of the ship in actual seas.

Additional Statement 15

The providing system of ship propulsive performance in actual seas described in any one of the additional statements 1 to 14, wherein the fuel consumption index providing means provides at least one of the calculation result of the calculating means of ship performance in actual seas, the sailing condition and the ship condition which are input by the condition inputting means.

According to this configuration, it is possible to provide, to the user together with the index concerning the fuel consumption, the calculation result of the calculating means of ship performance in actual seas which becomes a base to derive the index. According to this, the user easily study sailing configuration of the ship and easily reviews a maintenance period, and easily check an actual power curves. It is possible to provide a condition which is input by the condition inputting means to the user. According to this, the user can easily consider under what condition the index concerning the fuel consumption is derived.

The above description includes typical embodiments by the present disclosures. These examples are for description and the present invention is not limited to the examples. The present disclosures may be carried out in a configuration which is different from a configuration described in the specification expressly, and various corrections, optimization and modifications which coincides with the scope of claims can be realized by a person skilled in the art.

INDUSTRIAL APPLICABILITY

If the evaluation method of ship propulsive propulsive performance in actual seas, the evaluation program of ship propulsive performance in actual seas and the evaluation system of ship performance in actual seas of the present invention are used, it is possible to appropriately evaluate propulsive performance in actual seas also before the ship sails.

Further, if the providing system of ship propulsive performance in actual seas of the invention is used, it is possible to appropriately evaluate performance of the ship in actual seas also before the ship sails for example.

EXPLANATION OF SYMBOLS

1 calculating method of ship performance in actual seas
2 standard sailing model
4 specific fuel consumption
5 life cycle main. engine fuel consumption
10 standard sailing model setting means
20 condition inputting means
30 ship response calculating means
40 fuel consumption. index deriving means
50 fuel consumption index outputting means
S1 standard sailing model setting step
S2 condition inputting step
S17 ship response calculating step
S21 fuel consumption index deriving step
S22 index outputting step

The invention claimed is:

1. An evaluation method of ship propulsive performance in actual seas, comprising the steps of:
 setting a standard sailing model of a ship;
 inputting a sailing condition of the ship and a ship condition of the ship to the standard sailing model;
 applying the standard sailing model which has received the sailing condition and the ship condition therein to a previously verified calculating method of ship performance in actual seas; and thereafter,
 evaluating propulsive performance of the ship in actual seas, wherein
 the calculating method of ship performance in actual seas is a method in which all or a portion of a basic calculating method of ship performance in actual seas is previously verified as a calculating method, at which a ship propulsive performance index which evaluates ship propulsive performance in the actual seas is obtained, based on data obtained in the actual seas, a simulation technique which is tailored to the actual seas, or propulsive performance of an actual ship in the actual seas, the evaluation method of ship propulsive performance in actual seas, further comprising:

a standard sailing model setting step for setting the standard sailing model;

a condition inputting step for selecting a ship route, setting a loading condition, setting an evaluation period as sailing conditions, and inputting the ship condition;

a ship response calculating step for applying, to the calculating method of ship performance in actual seas, at least one of an external force condition acting on a ship caused by weather/marine weather which differs depending upon the ship route, the external force condition of the ship which differs depending upon the loading condition; and a driving condition of the ship, as well as at least one of change of the external force condition caused by the evaluation period, and change of the driving condition, thereby calculating ship response; and a fuel consumption index deriving step for deriving an index concerning fuel consumption of the ship based on a calculation result of the ship response and an operation mode of a main engine.

2. The evaluation method of ship propulsive performance in actual seas according to claim 1, wherein a weather/marine weather condition is input to the standard sailing model as the sailing condition, and ship propulsive performance in actual seas is evaluated using the standard sailing model into which the weather/marine weather condition is input.

3. The evaluation method of ship propulsive performance in actual seas according to claim 1, wherein the weather/marine weather which differs depending upon the ship route is used by setting occurrence probability with respect to the weather/marine weather which corresponds to the selected ship route.

4. The evaluation method of ship propulsive performance in actual seas according to claim 1, wherein an aging deterioration rate including biological fouling of the ship's hull or a propeller which differ depending upon the evaluation period is used as change of the external force condition and the driving condition caused by the evaluation period.

5. The evaluation method of ship propulsive performance in actual seas according to claim 1, wherein a deterioration rate of a driving system which drives the ship and which differs depending upon the evaluation period is used as change of the driving condition caused by the evaluation period.

6. The evaluation method of ship propulsive performance in actual seas according to claim 1, wherein an operation mode of the main engine is based on the driving condition which is set per the loading condition.

7. The evaluation method of ship propulsive performance in actual seas according to claim 2, wherein operation mode of the main engine and a governor which relate to an operation mode of the main engine are set in the condition inputting step.

8. The evaluation method of ship propulsive performance in actual seas according to claim 1, wherein to derive an index concerning the fuel consumption of the ship, a standard specific fuel consumption or a specific fuel consumption which is input in the condition inputting step are used.

9. The evaluation method of ship propulsive performance in actual seas according to claim 1, wherein life cycle main engine fuel consumption which is based on a total fuel consumption of the main engine for a long period of the ship is derived as the index concerning the fuel consumption.

10. A non-transitory computer readable storage medium containing program instructions for causing a computer to execute steps for an evaluation program of ship propulsive performance in actual seas, the steps comprising:

the condition inputting step in the evaluating method of ship propulsive performance in actual seas according to claim 1;

the ship response calculating step;

the fuel consumption index deriving step; and furthermore, an index outputting step for outputting the index concerning the fuel consumption.

11. The non-transitory computer readable storage medium according to claim 10, wherein life cycle main engine fuel consumption which is based on a total fuel consumption of a main engine for a long period of the ship is output as the index concerning the fuel consumption in the index outputting step.

12. The non-transitory computer readable storage medium according to claim 10, wherein at least a condition which is input in the condition inputting step is output in the index outputting step together with the index concerning the fuel consumption.

13. An evaluation system of ship propulsive performance in actual seas, comprising:

a standard sailing model setting means for setting a standard sailing model of the ship in actual seas;

a condition inputting means for selecting a ship route, setting a loading condition, setting an evaluation period as sailing conditions, and inputting a ship condition;

a ship response calculating means for applying the calculating method of ship performance in actual seas, at least one of an external force condition acting on a ship caused by weather/marine weather which differs depending upon the ship route, the external force condition of the ship which differs depending upon the loading condition, and a driving condition of the ship, as well as at least one of change of the external force condition caused by the evaluation period, and change of the driving condition, thereby calculating ship response; a fuel consumption index deriving means for deriving an index concerning fuel consumption of the ship based on a calculation result of the ship response and an operation mode of a main engine; and a fuel consumption index outputting means for outputting the index concerning the fuel consumption, wherein the calculating method of ship performance in actual seas is a method in which all or a portion of a basic calculating method of ship performance in actual seas is previously verified as a calculating method, at which a ship propulsive performance index which evaluates ship propulsive performance in the actual seas is obtained, based on data obtained in the actual seas, a simulation technique which is tailored to the actual seas, or propulsive performance of an actual ship in the actual seas.

14. The evaluation system of ship propulsive performance in actual seas according to claim 13, wherein the fuel consumption index outputting means outputs the index concerning the fuel consumption together with a condition which is input by the condition inputting means.

* * * * *